US012292828B2

(12) United States Patent
Ju et al.

(10) Patent No.: US 12,292,828 B2
(45) Date of Patent: May 6, 2025

(54) DYNAMIC MEMORY MANAGEMENT APPARATUS AND METHOD FOR ALLOCATING/DEALLOCATING DYNAMIC MEMORY USING THE SAME

(71) Applicant: ELECTRONICS AND TELECOMMUNICATIONS RESEARCH INSTITUTE, Daejeon (KR)

(72) Inventors: Hong-Il Ju, Daejeon (KR); Dong-Wook Kang, Daejeon (KR); Gae-Il An, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/349,673

(22) Filed: Jul. 10, 2023

(65) Prior Publication Data
US 2024/0160565 A1    May 16, 2024

(30) Foreign Application Priority Data

Nov. 14, 2022  (KR) .................... 10-2022-0151420

(51) Int. Cl.
*G06F 12/02*    (2006.01)
(52) U.S. Cl.
CPC .. *G06F 12/0292* (2013.01); *G06F 2212/1052* (2013.01)
(58) Field of Classification Search
CPC ............. G06F 12/0292; G06F 2212/1052
See application file for complete search history.

(56) References Cited

U.S. PATENT DOCUMENTS

| 8,151,086 B2 * | 4/2012 | McDavitt .............. G06F 12/023 |
| | | 711/170 |
| 10,664,589 B2 | 5/2020 | Kang et al. |
| 2017/0185324 A1 * | 6/2017 | Hack ..................... G06F 3/0685 |
| 2021/0334220 A1 | 10/2021 | Petz |
| 2022/0058119 A1 * | 2/2022 | Tsirkin ................ G06F 12/0646 |

FOREIGN PATENT DOCUMENTS

| KR | 10-2018-0062796 A | 6/2018 |
| KR | 10-2233476 B1 | 3/2021 |

* cited by examiner

*Primary Examiner* — Mark A Giardino, Jr.

(57) ABSTRACT

Disclosed herein are a dynamic memory management apparatus and a method for allocating/deallocating dynamic memory. The apparatus includes actual memory configured to allocate or deallocate a heap, virtual memory configured to set/store heap allocation information at a virtual address mapped to an actual address that is a body start address of a heap area of the actual memory, and a dynamic memory manager configured to process a memory allocation or deallocation request and the virtual memory, wherein the heap allocation information includes access authority information for storing information indicating whether a heap at an actual address is allocated or deallocated, and count information increased whenever a heap is allocated, and the dynamic memory manager is configured to return an address pointer including an actual address of a heap allocated to the actual memory and heap allocation information to the program, and process a heap deallocation or reallocation request.

20 Claims, 18 Drawing Sheets

```
1) Ptr1 = malloc(0x10);
2) Ptr2 = malloc(0x10);
3) Ptr3 = malloc(0x10);

4) Ptr6 = ptr1;

5) Free(ptr1);
6) Free(ptr3);

7) Ptr4 = malloc(0x10); // ptr3 REALLOCATION

8) Free(ptr2); // NOT MERGED WITH ptr10

9) Ptr5 = malloc(0x10); //  ptr2 REALLOCATION 10)  printf("ptr1=0x%x\n",*ptr1);
     printf("ptr2=0x%x\n",*ptr2);
     printf("ptr3=0x%x\n",*ptr3);
     printf("ptr4=0x%x\n",*ptr4);
     printf("ptr5=0x%x\n",*ptr5);
     printf("ptr6=0x%x\n",*ptr6);
```

FIG. 11

```
10) AFTER EXECUTION OF FUNCTION printf()
 - ptr1 = 0x88000000_0001f840 (BLOCKED, COLR MISMATCH)
 - ptr2 = 0x90000000_0001f860 (BLOCKED, COUNT MISMATCH)
 - ptr3 = 0x98000000_0001f880 (BLOCKED, COUNT MISMATCH)
 - ptr4 = 0xa0000000_0001f880 (ALLOWED, COLR & COUNT MATCH)
 - ptr5 = 0xa8000000_0001f860 (ALLOWED, COLR & COUNT MATCH)
 - ptr6 = 0x88000000_0001f840 (BLOCKED, COLR MISMATCH)
```

FIG. 13

```
1) Ptr1 = malloc(0x80);
2) Ptr2 = malloc(0x80);
3) Ptr3 = malloc(0x80);

4) Ptr6 = ptr1;

5) Free(ptr1);
6) Free(ptr3);

7) Ptr4 = malloc(0x80); // ptr1 REALLOCATION

8) Free(ptr2); // MERGE WITH ptr3

9) Ptr5 = malloc(0x80); // ptr2 REALLOCATION 10) printf("ptr1=0x%x\n",*ptr1);
    printf("ptr2=0x%x\n",*ptr2);
    printf("ptr3=0x%x\n",*ptr3);
    printf("ptr4=0x%x\n",*ptr4);
    printf("ptr5=0x%x\n",*ptr5);
    printf("ptr6=0x%x\n",*ptr6);
```

FIG. 15

```
10) AFTER EXECUTION OF FUNCTION printf()
 -  ptr1 = 0x88000000_0001f840 (BLOCKED, COLR MISMATCH)
 -  ptr2 = 0x90000000_0001f8d0 (BLOCKED, COUNT MISMATCH )
 -  ptr3 = 0x98000000_0001f960 (BLOCKED, COLR MISMATCH)
 -  PTR4 = 0XA0000000_0001F840 ( ALLOWED, COLR & COUNT MATCH)
 -  PTR5 = 0XA8000000_0001F8D0 ( ALLOWED, COLR & COUNT MATCH)
 -  ptr6 = 0x88000000_0001f840 (BLOCKED, COUNT MISMATCH)
```

FIG. 17

DYNAMIC MEMORY MANAGEMENT APPARATUS AND METHOD FOR ALLOCATING/DEALLOCATING DYNAMIC MEMORY USING THE SAME

CROSS REFERENCE TO RELATED APPLICATION

This application claims the benefit of Korean Patent Application No. 10-2022-0151420, filed Nov. 14, 2022, which is hereby incorporated by reference in its entirety into this application.

BACKGROUND OF THE INVENTION

1. Technical Field

The following embodiments relate to dynamic memory management technology for dynamically allocating and deallocating a memory area. More particularly, the following embodiments relate to technology for detecting security vulnerabilities known as Use-After-Free (UAF), which may occur when a deallocated memory area is reallocated and used without being returned to a kernel.

2. Description of the Related Art

Use-After-Free (UAF) is one of memory security vulnerabilities that are still abused most frequently by many attackers to date. The reason for this is that programming languages such as C and C++ that are insecure in memory management are still used to implement critical systems such as kernels and browsers. UAF refers to a vulnerability occurring when deallocated memory is accessible even after dynamically allocated memory is deallocated. That is, a UAF bug occurs when a program intends to refer to a dangling pointer indicating a deallocated entity.

The best approach to mitigate such UAF is to prevent a memory manager from reusing deallocated memory and prohibit attackers from performing memory control associated with a dangling pointer, thus preventing attacks from being made using UAF. However, when a program requests dynamic memory allocation so as to improve performance and efficiency, most memory managers reallocate and use deallocated memory. A GNU C Library (glibc) provided as a basic library in a Linux system caches deallocated chunks in various bins and reuses the deallocated chunks, thus rapidly responding to subsequent requests.

Representative examples of conventional UAF vulnerability detection technology are combination technology of a Red-Zone insertion technique and a Reuse Delay technique and coloring technology. Further, in order to solve UAF security vulnerabilities, there are methods such as a method of designating labels for respective memory chunks that are dynamically allocated and verifying whether the corresponding chunks are allocated or deallocated and a method of, when the chunks are deallocated after being allocated, setting the chunks to null values and then actively invalidating a dangling pointer. However, these methods are problematic in that a high performance overhead occurs.

Furthermore, there is a method of individually identifying and deallocating garbage entities using extra CPU cores, but this method is disadvantageous in that additional resources are required and scalability is limited.

SUMMARY OF THE INVENTION

An embodiment is intended to more securely manage dynamic memory by preventing the occurrence of a dangling pointer for a previously deallocated address and preventing an attacker from abusing the previously deallocated address.

An embodiment is intended to prevent the occurrence of a dangling pointer for a previously deallocated address without causing a high performance overhead or adding resources.

In accordance with an aspect, there is provided a dynamic memory management apparatus, including an actual memory configured to allocate or deallocate a heap, a virtual memory configured to set and store heap allocation information at a virtual address mapped to an actual address that is a body start address of a heap area of the actual memory, and a dynamic memory manager configured to process a memory allocation or deallocation request received from a program in conjunction with the actual memory and the virtual memory, wherein the heap allocation information includes access authority information for storing information indicating whether a heap at an actual address is allocated or deallocated, and count information that is increased whenever a heap is allocated, and wherein the dynamic memory manager is configured to return an address pointer including an actual address of a heap allocated to the actual memory and the heap allocation information to the program, and process a heap deallocation or reallocation request based on the heap allocation information included in a requested address pointer.

The dynamic memory manager may perform as a request to allocate a heap having a predetermined size is received from the program, requesting the actual memory to allocate the heap having the predetermined size, requesting the virtual memory to set and store the heap allocation information at a virtual address mapped to the actual address of the heap allocated to the actual memory, and returning a pointer address including the actual address and the heap allocation information to the program.

The dynamic memory manager may further perform, as a request to deallocate an allocated heap included in the address pointer is received from the program, obtaining heap allocation information stored at the virtual address mapped to the actual address requested to be deallocated from the virtual memory, when the heap allocation information included in the address pointer matches the heap allocation information obtained from the virtual memory, requesting the actual memory to deallocate the heap corresponding to the actual address, requesting the virtual memory to set and store heap deallocation information at the virtual address mapped to the actual address of the heap deallocated from the actual memory, and registering a deallocated heap area in a heap deallocation linked list.

The dynamic memory manager may further perform, when a request to allocate a heap having a size identical to a previous allocation size is received from the program, requesting the actual memory to reallocate a heap for a heap deallocation area in a case where a reallocable heap area is present in the heap deallocation linked list in requesting the actual memory to allocate the heap, returning a pointer address including heap allocation information in which count information for the heap area is increased in returning to the program, and deleting the reallocated heap area from the heap deallocation linked list.

The dynamic memory manager may further perform, as a request to use the actual address together with the address pointer is received from the program, obtaining the heap allocation information stored at the virtual address mapped to the actual address from the virtual memory, comparing count information of the heap allocation information included in the pointer address with count information of the heap allocation information obtained from the virtual memory, and processing the use request or generating exception based on a result of the comparison.

The address pointer may be configured such that an actual address is recorded in an address field of partial lower bits, access authority information and count information are sequentially recorded in a reserved field of partial upper bits, and the count information is changed depending on a size of the reserved field.

The actual memory may be allocated to be separated into a heap header area and a heap body area, the heap header area includes size information of a previous heap area and size information of a current heap area, and the heap body area includes the actual address returned to the program.

The virtual memory may be individually mapped to the heap header area and the heap body area of the actual memory.

In response to a heap allocation information setting request, the count information of the virtual memory is set to, when at least one adjacent heap area is not present, a value obtained by increasing count information of a current heap area, and when at least one adjacent heap area is present, a value obtained by increasing a maximum value of a count value of the at least one adjacent heap area and a count value of the current heap area.

In response to a heap allocation information setting request, the access authority information of the virtual memory may be set such that a header area is set to '0' and a body area is set to '1'.

In response to a heap deallocation information setting request, the count information of the virtual memory may be configured to, when at least one adjacent heap deallocation area is not present, maintain the count information of the heap area at a count value of the current heap area, when at least one adjacent heap deallocation area is present and the heap area is to be merged with the at least one adjacent heap deallocation area, set a count value of a merged heap deallocation area to a larger value of a count value of the adjacent heap deallocation area and a count value of a current heap deallocation area, and when at least one adjacent heap deallocation area is present, and the heap area is not to be merged with the at least one adjacent heap deallocation area, maintain and set a previous count value of the current heap area.

In response to the heap deallocation information setting request, the access authority information of the virtual memory may be configured such that the header area is set to '0' and the body area is set to '0'.

In accordance with another aspect, there is provided a dynamic memory allocation method being performed using a dynamic memory management apparatus, wherein the dynamic memory management apparatus includes an actual memory configured to allocate or deallocate a heap, and a virtual memory configured to set and store heap allocation information at a virtual address mapped to an actual address that is a body start address of a heap area of the actual memory, and the dynamic memory allocation method includes as a request to allocate a heap having a predetermined size is received from the program, requesting the actual memory to allocate the heap having the predetermined size, requesting the virtual memory to set and store the heap allocation information at a virtual address mapped to the actual address of the heap allocated to the actual memory, and returning a pointer address including the actual address and the heap allocation information to the program.

The dynamic memory allocation method may further include, when a request to allocate a heap having a size identical to a previous allocation size is received from the program, requesting the actual memory to reallocate a heap for a heap deallocation area in a case where a reallocable heap area is present in the heap deallocation linked list in requesting the actual memory to allocate the heap, returning a pointer address including heap allocation information in which count information for the heap area is increased in returning to the program, and deleting the reallocated heap area from the heap deallocation linked list.

The dynamic memory allocation method may further include, as a request to use the actual address together with the address pointer is received from the program, obtaining the heap allocation information stored at the virtual address mapped to the actual address from the virtual memory, comparing count information of the heap allocation information included in the pointer address with count information of the heap allocation information obtained from the virtual memory, and processing the use request or generating exception based on a result of the comparison.

In response to a heap allocation information setting request, the count information of the virtual memory may be set to, when at least one adjacent heap area is not present, a value obtained by increasing count information of a current heap area, and when at least one adjacent heap area is present, a value obtained by increasing a maximum value of a count value of the at least one adjacent heap area and a count value of the current heap area.

In response to a heap allocation information setting request, the access authority information of the virtual memory is set such that a header area is set to '0' and a body area is set to '1'.

In accordance with a further aspect, there is provided a dynamic memory deallocation method being performed using a dynamic memory management apparatus, wherein the dynamic memory management apparatus includes an actual memory configured to allocate or deallocate a heap and a virtual memory configured to set and store heap allocation information at a virtual address mapped to an actual address that is a body start address of a heap area of the actual memory, and the dynamic memory deallocation method includes, as a request to deallocate an allocated heap included in an address pointer is received from a program, obtaining heap allocation information stored at a virtual address mapped to the actual address requested to be deallocated from the virtual memory, when the heap allocation information included in the address pointer matches heap allocation information obtained from the virtual memory, requesting the actual memory to deallocate the heap corresponding to the actual address, requesting the virtual memory to set and store heap deallocation information at the virtual address mapped to the actual address of the heap deallocated from the actual memory, and registering a deallocated heap area in a heap deallocation linked list.

In response to a heap deallocation information setting request, the count information of the virtual memory may be configured to, when at least one adjacent heap deallocation area is not present, maintain the count information of the heap area at a count value of the current heap area, when at least one adjacent heap deallocation area is present and the heap area is to be merged with the at least one adjacent heap deallocation area, set a count value of a merged heap deallocation area to a larger value of a count value of the adjacent heap deallocation area and a count value of a current heap deallocation area, and when at least one adjacent heap deallocation area is present, and the heap area is not to be merged with the at least one adjacent heap deallocation area, maintain and set a previous count value of the current heap area.

In response to the heap deallocation information setting request, the access authority information of the virtual memory may be configured such that the header area is set to '0' and the body area is set to '0'.

BRIEF DESCRIPTION OF THE DRAWINGS

The above and other objects, features and advantages of the present disclosure will be more clearly understood from the following detailed description taken in conjunction with the accompanying drawings, in which:

FIG. 11 is a diagram illustrating an example of a heap allocation program according to an embodiment;

FIG. 13 is a diagram illustrating an example of the result of execution of a heap reallocation program according to an embodiment;

FIG. 15 is a diagram illustrating an example of a heap allocation program according to another embodiment;

FIG. 17 is a diagram illustrating an example of the result of execution of a heap reallocation program according to another embodiment;

DESCRIPTION OF THE PREFERRED EMBODIMENTS

Figure 1:
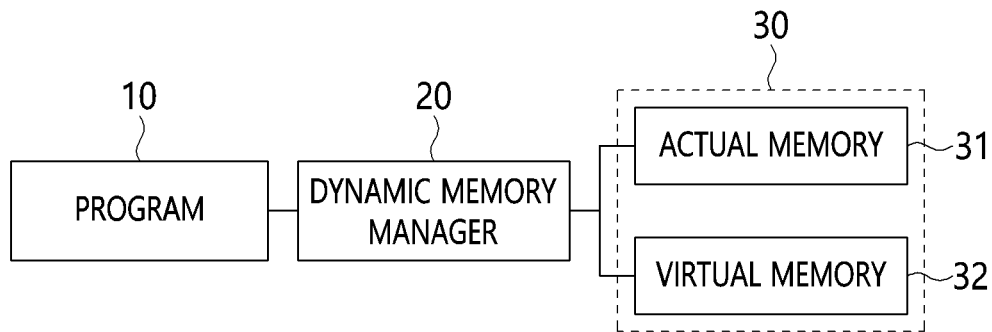
FIG. 1 is a schematic block configuration diagram of a dynamic memory management apparatus according to an embodiment.

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

Hereinafter, a dynamic memory management apparatus and a method for allocating/deallocating dynamical memory using the apparatus according to embodiments will be described in detail with reference to FIGS. 1 to 19.

FIG. 1 is a schematic block configuration diagram of a dynamic memory management apparatus according to an embodiment.

Referring to FIG. 1, the dynamic memory management apparatus according to the embodiment may include a dynamic memory manager 20 for allocating or deallocating dynamic memory 30 in response to a request received from a program 10.

Here, the dynamic memory 30 according to an embodiment may include actual memory 31 for allocating or deallocating heaps and virtual memory 32 for setting and storing heap allocation information at a virtual address mapped to the actual address of the heap area of the actual memory 31.

Therefore, the dynamic memory manager 20 according to the embodiment may process a memory allocation or deallocation request received from the program 10 in conjunction with the actual memory 31 and the virtual memory 32.

Here, because the operating scheme of a memory allocator supported by the operating system of the computing system may vary, the described embodiment will be described based on the dynamic memory manager 20 used in Linux Glibc. However, this is only an embodiment, and the present disclosure is not limited thereto.

When memory allocated through a malloc function is deallocated through a free function, the dynamic memory manager 20 of Glibc uses a structure called 'bin' for managing the deallocated memory. This is a linked list for managing areas that are deallocated and not reallocated in order to improve the efficiency of memory management when dynamically allocating and deallocating memory.

That is, as a deallocation request for allocated memory is received, a deallocated memory area is added to a heap deallocation linked list freelist. Further, in response to a new memory allocation request, an allocable memory area is searched for in the freelist including previously deallocated memory areas.

In this case, when there is an allocable memory area having a requested size, the freelist removes the corresponding memory area, and reallocates the corresponding memory area.

Further, in an embodiment, during deallocation of a memory area, embodiments for the case where the corresponding memory area is merged with an adjacent heap area when the adjacent heap area is deallocated, and the case where the corresponding memory area is not merged with an adjacent heap area even though an adjacent heap area is deallocated will be described.

Further, in an embodiment, a heap area of the virtual memory 32 mapped to a heap area of the actual memory 31 is mapped at a size of 1/16, and the header and the body of the heap area of the actual memory 31 are mapped to the header and the body of the heap area of the virtual memory 32.

In an embodiment, the addresses of the area of the virtual memory 32 are defined as "0x3000_0000 to 0x3fff_ffff", and mapping between the addresses of the actual memory and the addresses of the virtual memory is implemented by performing a shift operation '>>4 bit' on the lower 4 bytes of the addresses of the actual memory and adding 0x3000_0000, which is the base address of the virtual memory 32, to the shifted result. This shows that a heap area is allocated in units of 16 bytes in a 64-bit machine, and thus a lower 4-bit value of each address is meaningless. Therefore, 16 bytes of the actual memory 31 are mapped to 1 byte of the virtual memory 32.

Meanwhile, heap allocation information set and stored in the virtual memory 32 according to the embodiment may include access authority (color or colr) information in which allocation or deallocation of a heap corresponding to the actual address is stored, and count information that is increased whenever a heap is allocated.

Therefore, the dynamic memory manager 20 according to the embodiment may return an address pointer including the actual address of a heap allocated to the actual memory 31 and heap allocation information to the program 10, and may process heap deallocation or reallocation based on heap allocation information included in a requested address pointer in response to a heap deallocation or reallocation request.

Figure 2:
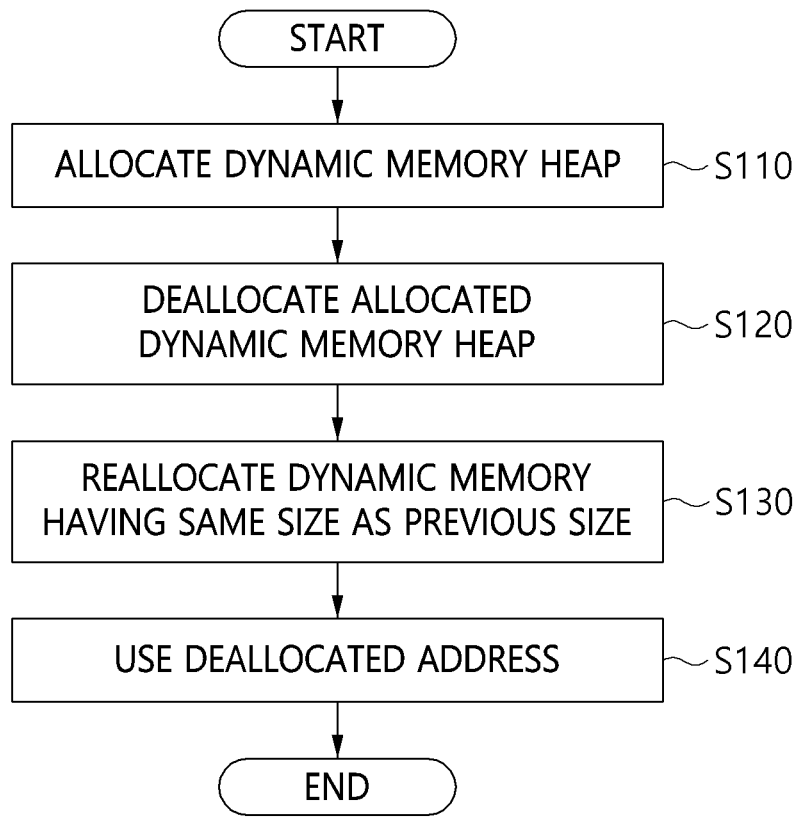
FIG. 2 is a flowchart illustrating a method for allocating and deallocating dynamic memory using a dynamic memory management apparatus according to an embodiment.

FIG. 2 is a flowchart illustrating a method for allocating and deallocating dynamic memory using a dynamic memory management apparatus according to an embodiment.

Here, FIG. 2 shows only an example to easily describe the operation of the dynamic memory management apparatus according to the embodiment, and the dynamic memory management apparatus is not necessarily operated in the order of FIG. 2.

Referring to FIG. 2, the dynamic memory management apparatus may perform step S110 of allocating a dynamic memory heap, step S120 of deallocating the allocated dynamic memory heap, step S130 of reallocating dynamic memory at the same size as a previous dynamic memory heap size, and step S140 of processing a request to use a deallocated address.

Here, step S110 of allocating the dynamic memory heap according to an embodiment may include the step of, as a request to allocate a heap having a predetermined size is received from a program, requesting the actual memory to allocate the heap having a predetermined size, the step of requesting the virtual memory to set and store heap allocation information at a virtual address mapped to the actual address of the heap allocated to the actual memory, and the step of returning a pointer address including the actual address and the heap allocation information to the program. Detailed description thereof will be made later with reference to FIG. 3.

Here, step S120 of deallocating the allocated dynamic memory heap may include the step of, as a request to deallocate the allocated heap included in the address pointer is received from the program, the step of obtaining heap allocation information stored at the virtual address mapped to the actual address requested to be deallocated from the virtual memory, the step of, when the heap allocation information included in the address pointer matches the heap allocation information obtained from the virtual memory, requesting the actual memory to deallocate the heap corresponding to the actual address, the step of requesting the virtual memory to set and store heap deallocation information at the virtual address mapped to the actual address of the heap deallocated from the actual memory, and the step of registering the deallocated heap area in a heap deallocation linked list. Detailed description thereof will be made later with reference to FIG. 4.

Here, step S130 of reallocating dynamic memory at the same size as a previous dynamic memory heap size may include the step of, when, at step S110, a request to allocate a heap having the same size as the previous heap allocation size is received from the program, requesting the actual memory to reallocate a heap for a heap deallocation area in the case where a reallocable heap area is present in the heap deallocation linked list at the heap allocation requesting step, the step of returning a pointer address including heap allocation information in which count information for the heap area is increased at the program return step, and the step of deleting the reallocated heap area from the heap deallocation linked list. Detailed description thereof will be made later with reference to FIG. 5.

Here, step S140 of processing the request to use the deallocated address may include the step of, as a request to use the actual address together with the address pointer is received from the program, obtaining the heap allocation information stored at the virtual address mapped to the actual address from the virtual memory, the step of comparing count information of the heap allocation information included in the pointer address with count information of the heap allocation information obtained from the virtual memory, and the step of processing the use request or generating exception based on the result of the comparison. Detailed description thereof will be made later with reference to FIG. 6.

Figure 3:
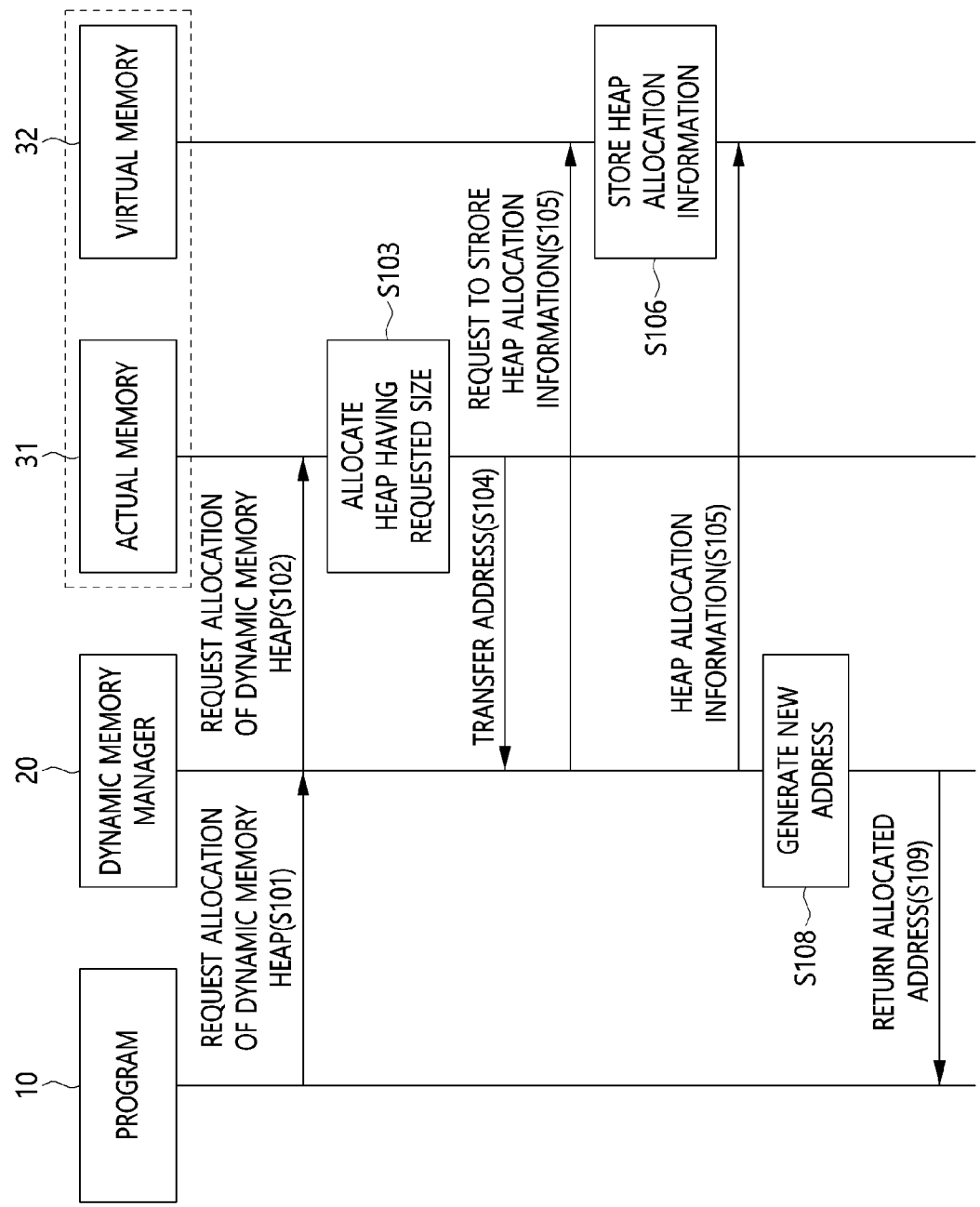
FIG. 3 is a signal flowchart illustrating the step of allocating a dynamic memory heap according to an embodiment.

FIG. 3 is a signal flowchart illustrating the step of allocating a dynamic memory heap according to an embodiment.

Referring to FIG. 3, the program 10 may request the dynamic memory manager 20 to allocate a heap having a desired size required for dynamic memory allocation at step S101. Here, the program 10 may execute the function ptr1=malloc(0x10).

Then, the dynamic memory manager 20 may request the actual memory 31 to request a heap at step S102.

Next, after the actual memory 31 allocates a heap having a requested size at step S103, the actual memory 31 transfers the actual memory address (ptr1=0x00000000_0001f840), which is the allocated pointer address, to the dynamic memory manager 20 at step S104.

Next, the dynamic memory manager 20 requests to store the heap allocation information at a virtual memory address (ptr1=0x30001f84) mapped to the received actual memory address at step S105. Subsequently, the virtual memory 32 sets and stores the heap allocation information (count, colr) at the virtual memory address (ptr1=0x30001f84) mapped to the actual memory address (ptr1=0x00000000_0001f840) at step S106.

Here, the heap allocation information may include access authority information (colr) information and count information (count).

Of the information, after heap allocation, the access authority information (colr) is set to 'colr=1 (access allowed)' to permit access to the corresponding heap area, whereas after heap deallocation, the access authority information (colr) is set to 'colr=0 (access blocked) to block access to the corresponding heap area.

Further, because the count information is set differently whenever a heap area is allocated, it may be used to detect a UAF bug occurring when a dangling pointer, appearing when the corresponding heap area is reallocated after being deallocated, is referenced.

Therefore, at step S106, the virtual memory 32 may set the values of the heap allocation information for heap allocation at ptr1 to count=1 (first heap allocation) and to colr=1 (access allowed), and may store the set heap allocation information (0x10000001(2)).

Thereafter, the virtual memory 32 may transmit the set heap allocation information (count=1, colr=1) to the dynamic memory manager 20 at step S107. Thereafter, when making access to the heap area is made, the access may be allowed or blocked.

Thereafter, the dynamic memory manager 20 generates a new pointer (ptr1) address (ptr1=0x81000000_0001f840) including the heap allocation information corresponding to ptr1 at step S108, and returns the new pointer address to the program 10 at step S109.

Here, the address returned to the program 10 may be the start address of the body of the heap area, rather than the header of the heap area.

Figure 4:
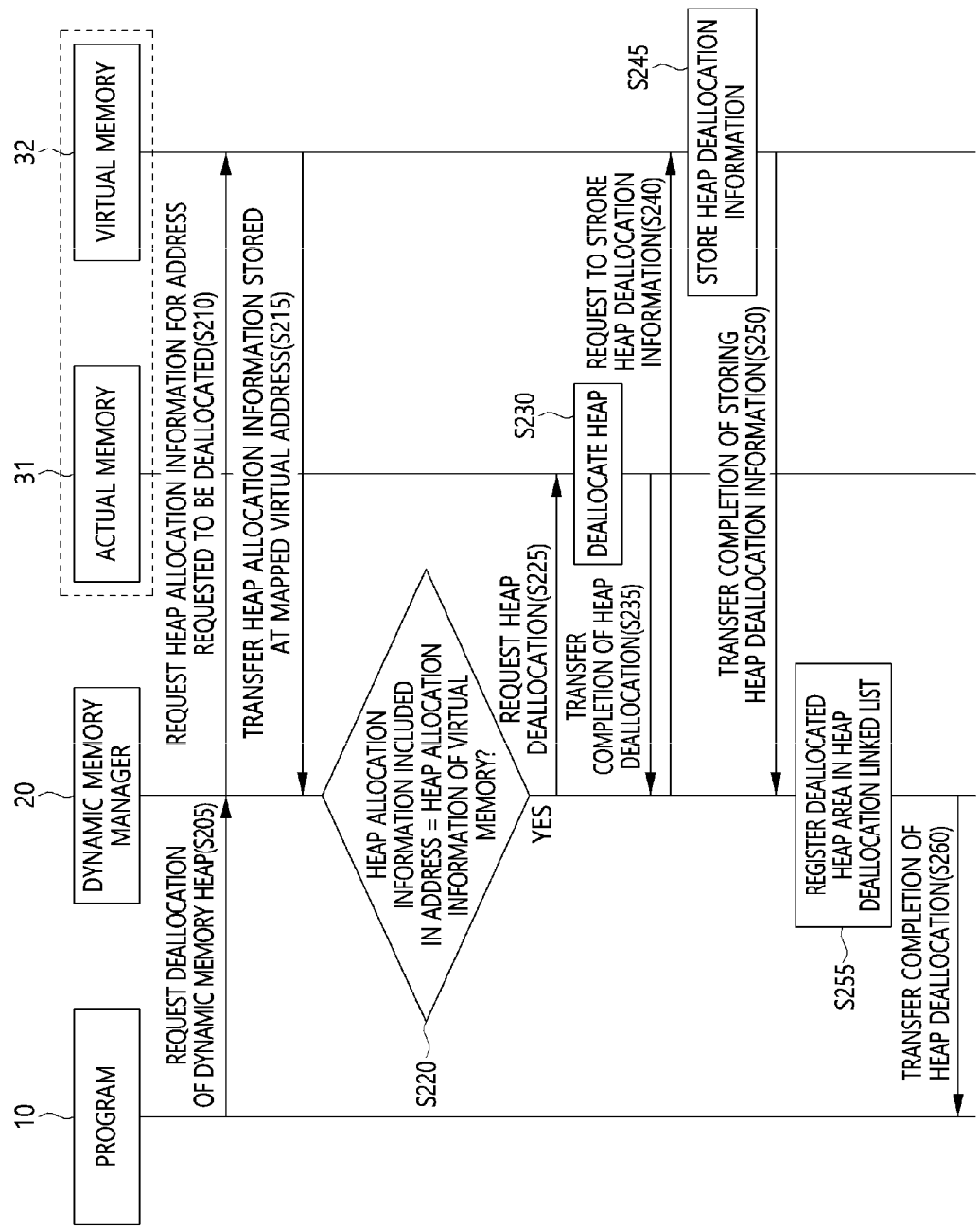
FIG. 4 is a signal flowchart illustrating the step of deallocating a dynamic memory heap according to an embodiment.

FIG. 4 is a signal flowchart illustrating the step of deallocating a dynamic memory heap according to an embodiment.

Referring to FIG. 4, the program 10 requests the dynamic memory manager 20 to deallocate allocated dynamic memory at step S205. Here, the program 10 may request the deallocation of a dynamic memory heap through a free (ptr1) function.

Then, the dynamic memory manager 20 requests the virtual memory 32 to transmit heap allocation information stored at the virtual memory address mapped to the actual memory address (ptr1=0x81000000_0001f840) requested to be deallocated at step S210, and receives the heap allocation information (count=1, colr=1) stored at the mapped virtual address (ptr1=0x30001f84) from the virtual memory 32 at step S215.

Further, when the heap allocation information (count=1, colr=1) included in the actual memory address requested to be deallocated matches the heap allocation information (count=1, colr=1) stored in the virtual memory 32 at step S220, the dynamic memory manager 20 requests the actual memory 31 to deallocate the heap at the actual memory address requested to be deallocated at step S225.

Next, when the actual memory 31 completes deallocation of the heap at the actual memory address at steps S230 and S235, the dynamic memory manager 20 requests the virtual memory 32 to store heap deallocation information at the virtual memory address mapped to the deallocated actual memory address at step S240.

Next, the virtual memory 32 stores the heap deallocation information (count=1, colr=0 (access blocked) at a virtual memory address mapped to the deallocated actually memory address at step S245. Thereafter, access to the heap area is blocked.

Next, when the completion of storing the heap deallocation information is verified at step S250, the dynamic memory manager 20 registers the deallocated heap area in a heap deallocation linked list (freelist) at step S255. By means of this, the deallocated heap area may be reallocated when a heap allocation request is received.

Figure 5:
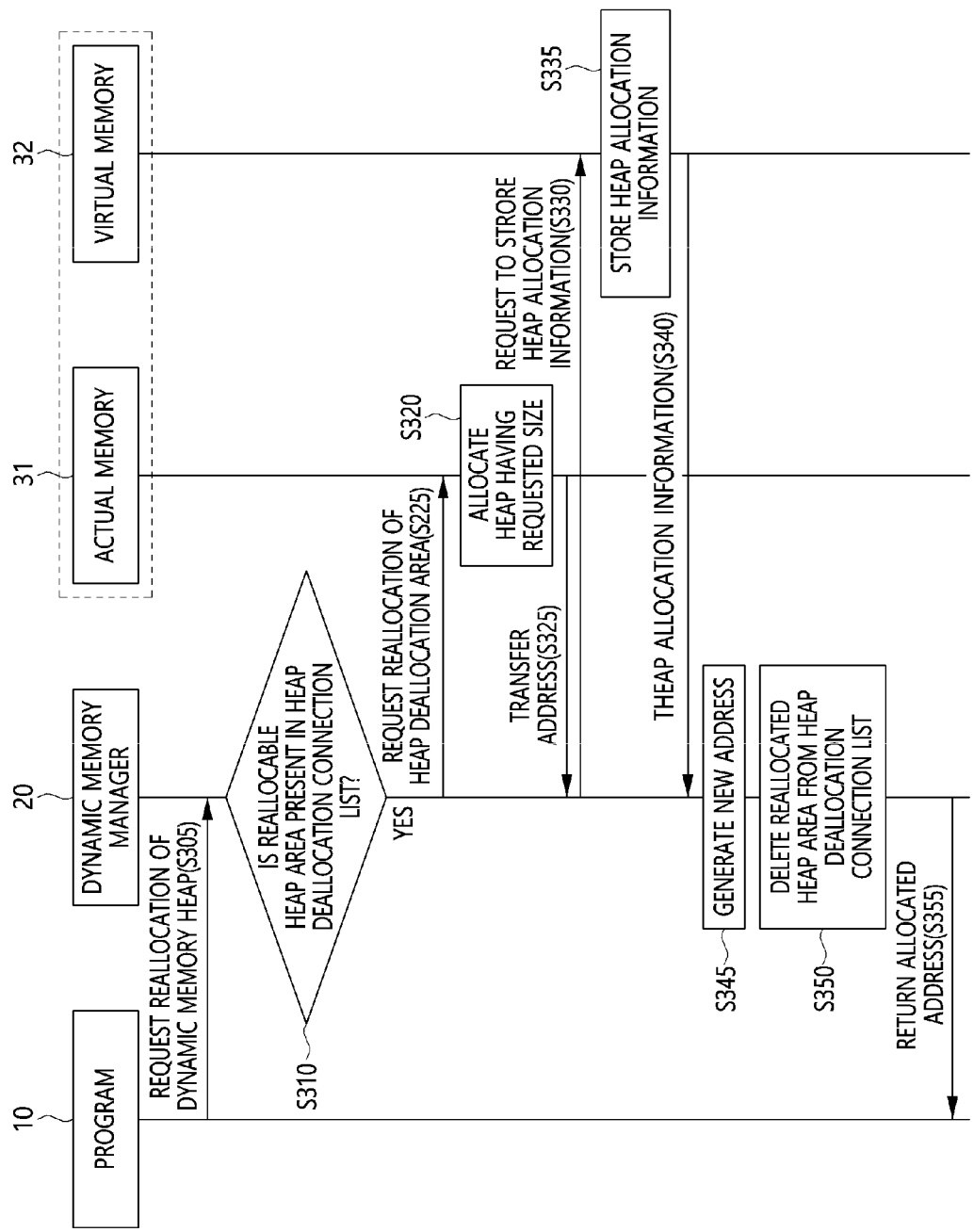
FIG. 5 is a signal flowchart illustrating the step of reallocating a dynamic memory heap according to an embodiment.

FIG. 5 is a signal flowchart illustrating the step of reallocating a dynamic memory heap according to an embodiment.

Referring to FIG. 5, the program 10 requests the dynamic memory manager 20 to allocate a dynamic memory area, having the same size as that requested to be allocated at step S101, at step S305. Here, the program 10 may execute the function ptr2=malloc(0x10).

When a reallocable heap area is present in the heap deallocation linked list (freelist) at step S310, the dynamic memory manager 20 requests the actual memory 31 to reallocate a heap at step S315.

Next, after the actual memory 31 allocates a heap having a requested size at step S320, the actual memory 31 transfers the actual memory address (ptr2=0x00000000_0001f840), which is the allocated pointer address, to the dynamic memory manager 20 at step S325.

Next, the dynamic memory manager 20 requests to store of the heap allocation information at a virtual memory address (ptr1=0x30001f84) mapped to the received actual memory address at step S330.

Subsequently, the virtual memory 32 sets and stores the heap allocation information (count, colr) at the virtual memory address (ptr1=0x30001f84) mapped to the actual memory address (ptr2=0x00000000_0001f840) at step S335.

Therefore, the virtual memory 32 may set the values of the heap allocation information for heap allocation at ptr1 to count=2 (second heap allocation) and to colr=1 (access allowed), and may store the set heap allocation information (1000_0010(2)).

Thereafter, the virtual memory 32 may transmit the set heap allocation information (count=2, colr=1) to the dynamic memory manager 20 at step S340. Thereafter, when making access to the heap area is made, the access may be allowed or blocked.

Thereafter, the dynamic memory manager 20 generates a new ptr2 address (ptr2=0x82000000_0001f840) including the heap allocation information corresponding to ptr2 at step S345.

Thereafter, the reallocated heap area is deleted from the heap deallocation linked list (freelist) at step S350, and the new ptr2 is returned to the program 10 at step S355.

Figure 6:
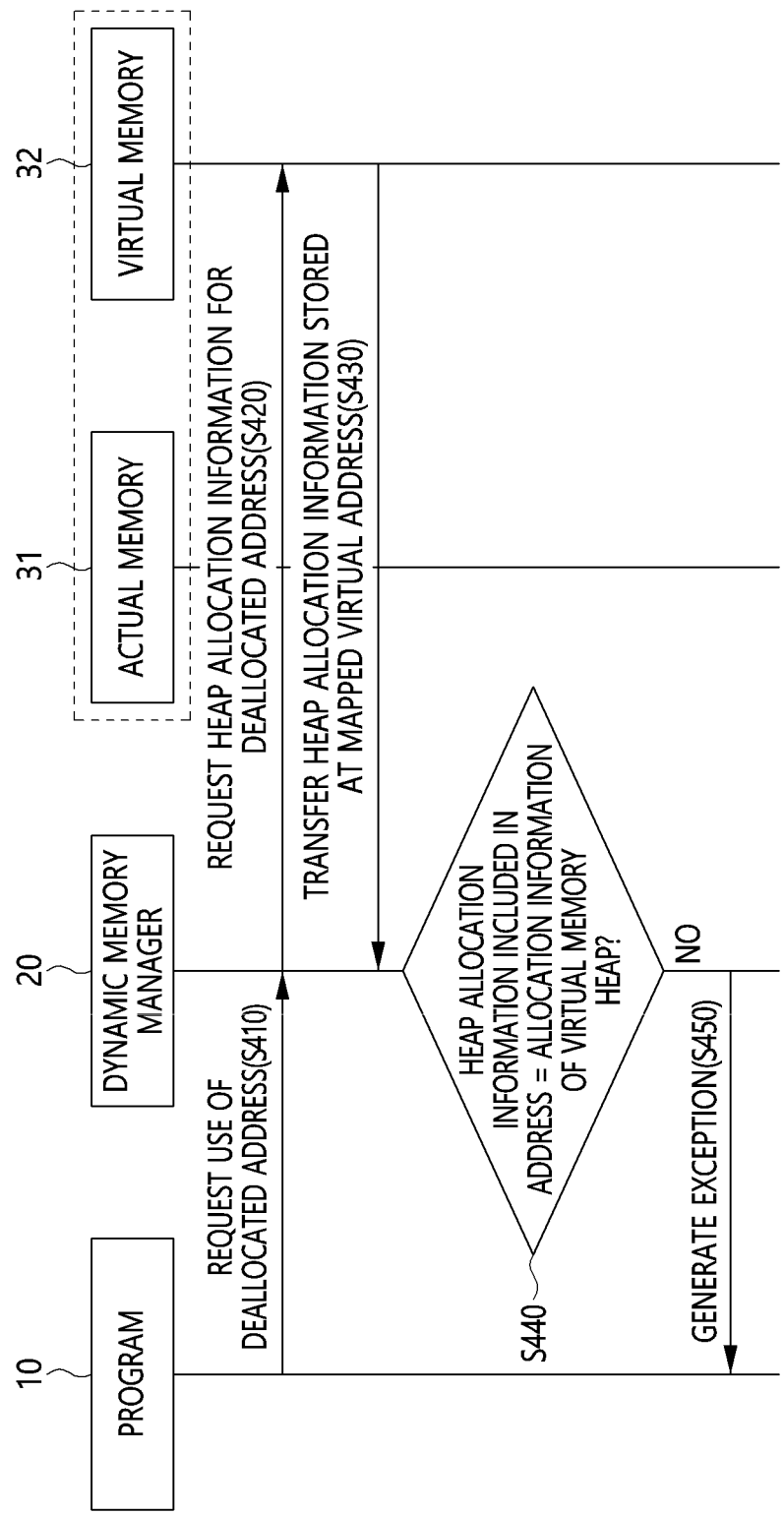
FIG. 6 is a signal flowchart illustrating the step of deallocating a dynamic memory heap according to an embodiment.

FIG. 6 is a signal flowchart illustrating the step of deallocating a dynamic memory heap according to an embodiment.

Referring to FIG. 6, as a request to use a deallocated address (ptr1) is received from the program 10 at step S410, the dynamic memory manager 20 requests heap allocation information stored at a virtual memory address mapped to the deallocated address (ptr1=0x81000000_0001f840) from the virtual memory 32 at step S420. Here, the program 10 may execute the function, for example, printf ("*ptr1=0x % x",*ptr1).

Then, the virtual memory 32 transfers heap allocation information (count=2, colr=1) stored at the mapped virtual memory address (ptr1=0x30001f84) to the dynamic memory manager 20 at step S430.

The dynamic memory manager 20 determines whether the heap allocation information (count=1, colr=1) included in the requested address (ptr1) matches the heap allocation information (count=2, colr=1) stored in the virtual memory 32 at step S440. Because it is determined at step S440 that the count values do not match each other, the dynamic memory manager 20 generates exception for the program 10 at step S450.

Figure 7:
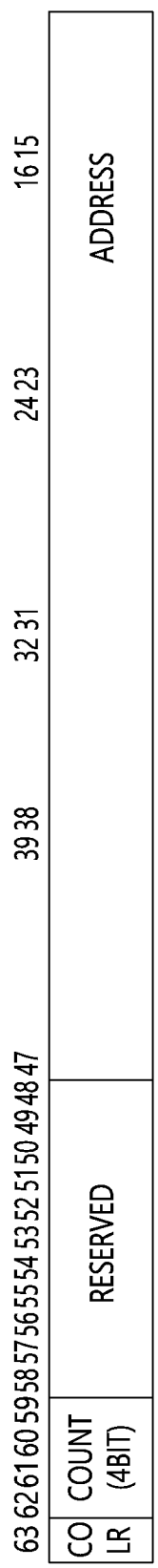
FIGS. 7 and 8 are diagrams illustrating examples of an address pointer format including heap allocation information according to an embodiment.
Figure 8:
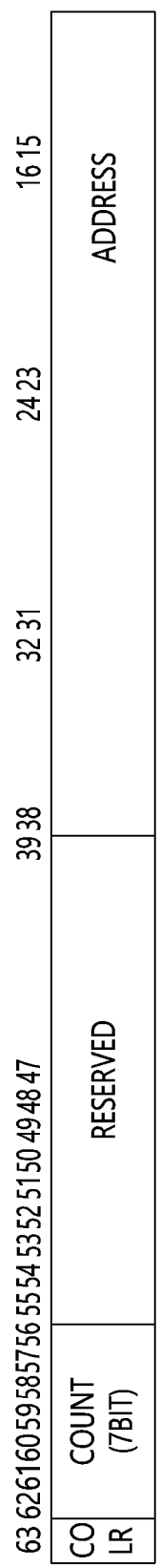

FIGS. 7 and 8 are diagrams illustrating examples of an address pointer format including heap allocation information according to an embodiment.

Referring to FIGS. 7 and 8, in the case of a 64-bit computer system, the length of a data pointer is 64 bits, a region of some upper bits among the 64 bits is generally set to 'reserved', and the address of a memory object is recorded in a region of some lower bits.

An address pointer format according to an embodiment may be configured in a format in which, as illustrated in FIG. 7, an address is recorded in an address field of lower 48 bits, and the remaining 16 bits are set to 'reserved', and thus 1 bit among the 16 bits is set to a colr field (access authority information), and 4 bits are added as a count field (heap area allocation information).

An address pointer format according to another embodiment may be configured in a format in which, as illustrated in FIG. 8, an address is recorded in an address field of lower 39 bits, and the remaining 25 bits are set to 'reserved', and thus 1 bit among the 25 bits is set to a colr field (access authority information), and 7 bits are added as a count field (heap area allocation information).

That is, because the number of bits set to 'reserved' in FIG. 8 is greater than the number of bits set to 'reserved' in FIG. 7, a more sufficient number of bits may be assigned to the count field. This means that the storage area of the heap allocation information can be changed depending on the format of the address pointer.

Therefore, in an embodiment, after heap allocation, information about the authority of access (colr) to the corresponding heap area and the heap count information (count) may be included in a 64-bit address to allocate a new address, and the heap allocation information (colr, count) identical to the new address may be stored in the virtual memory mapped to the actual memory.

Due thereto, even though a heap area is reallocated after being allocated and deallocated, another address different from a previous address is returned, thus preventing a dangling pointer from being referenced, and allowing access (colr=1) or blocking access (colr=0) depending on the access authority information set in the heap area.

Figure 9:
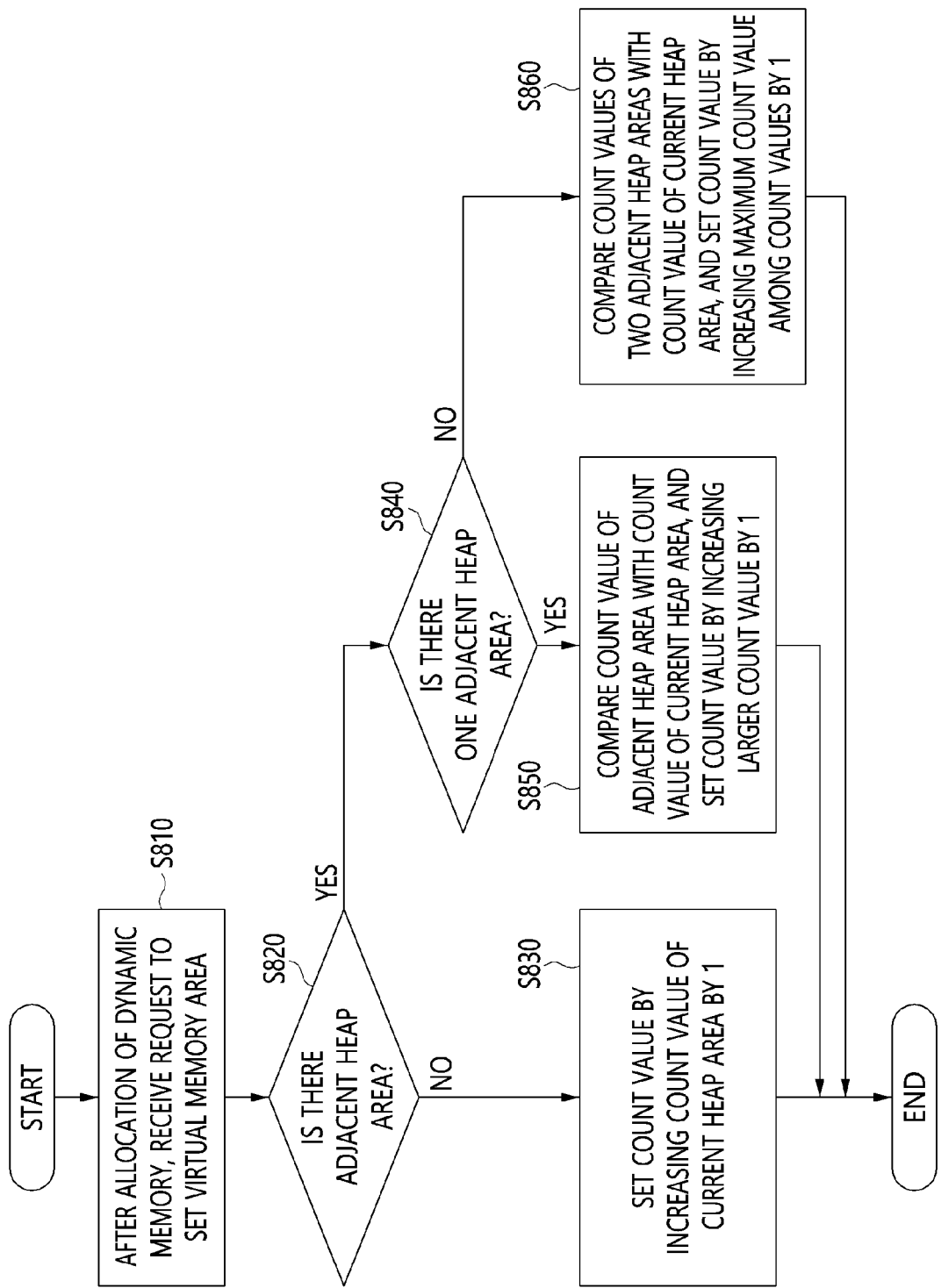
FIG. 9 is a flowchart illustrating in detail the step of setting heap allocation information in a heap area of virtual memory according to an embodiment.

FIG. 9 is a flowchart illustrating in detail the step of setting heap allocation information in a heap area of virtual memory according to an embodiment.

Referring to FIG. 9, when a heap area is generally allocated, it may be separated into a heap header area and a heap body area and then allocated. The heap header area has a length of 16 bytes, upper 8 bytes of which include size information of a previous heap area and lower 8 bytes of which include size information of a current heap area. Further, the heap body area is the address to be returned to the program and is used as a data area. Therefore, the heap area of the virtual memory mapped to the heap area of the actual memory may also be mapped to a header area and a body area.

As a request to set a virtual memory area is received at step S810 after dynamic memory is allocated, the count value of heap allocation information may be determined depending on whether there is an adjacent heap area.

First, after allocation of dynamic memory, when a request to set a heap area in the virtual memory 32 is received at step S810, whether there is an adjacent heap area is determined at step S820.

When it is determined at step S820 that no adjacent heap area is present, the virtual memory increases the count value of the current heap area by 1, and sets and stores the increased count value to the count value of the header and the body of the virtual memory at step S830.

On the other hand, when it is determined at step S820 that there is an adjacent heap area, the virtual memory compares the count value of the adjacent heap area with the count value of the current heap area, and sets and stores a count value by increasing a larger count value between the count values by 1 at step S850.

Here, when there are two or more adjacent heap areas at step S840, the virtual memory compares the count value of the current heap area with the count values of the two or more adjacent heap areas, and sets and stores the count value by increasing the largest count value, among the count values, by 1 at step S860.

Here, the same count value is stored in the header area and the body area of the virtual memory.

Here, the header area of the virtual memory is always set to colr=0 regardless of whether the heap is allocated and deallocated, thus blocking access to a heap allocation area by the program. Also, the body area of the virtual memory is set to colr=1, thus allowing subsequent access to the heap allocation area.

Figure 10:
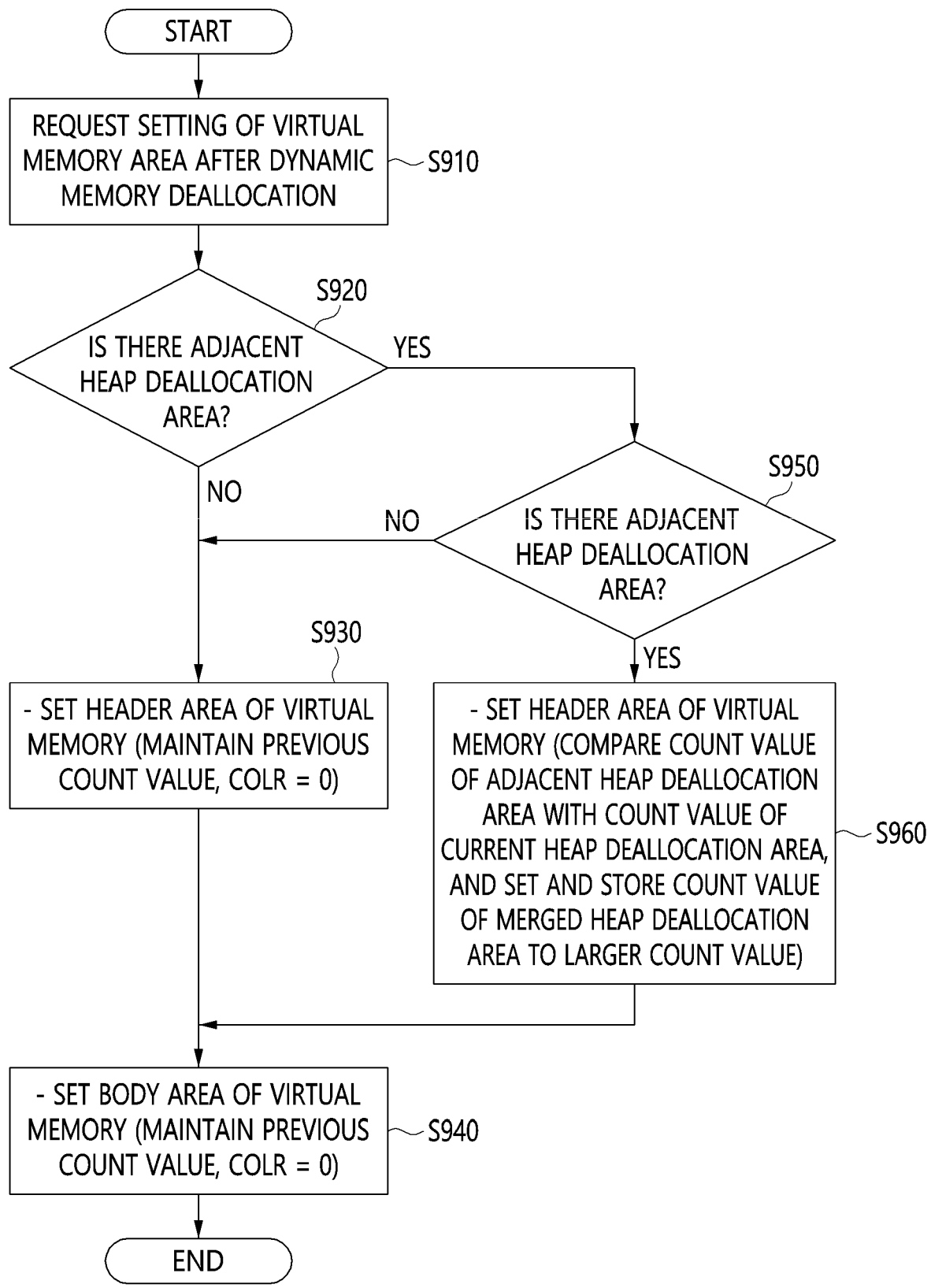
FIG. 10 is a flowchart illustrating in detail the step of deallocating heap allocation information in a heap area of virtual memory according to an embodiment.

FIG. 10 is a flowchart illustrating in detail the step of deallocating heap allocation information in a heap area of virtual memory according to an embodiment.

FIG. 10 illustrates a process of setting heap deallocation information in the heap area of virtual memory mapped to the address of actual memory after the heap area is deallocated from the actual memory.

Even during heap deallocation, as illustrated in FIG. 9, the heap area of the virtual memory mapped to the heap area of the actual memory is mapped to a header area and a body area, and the count value of heap allocation information is determined depending on whether there is an adjacent heap area.

First, after dynamic memory is deallocated, a request to set a heap deallocation area in the virtual memory is received at step S910, the virtual memory checks whether an adjacent heap deallocation area is present at step S920.

When it is determined at step S920 that there is no adjacent heap deallocation area, the virtual memory maintains the previous count value of the current heap area, and sets and stores a header area and a body area at steps S930 and S940.

On the other hand, when it is determined at step S920 that there is an adjacent heap deallocation area, the virtual memory determines whether the current heap area is to be merged with the adjacent heap deallocation area at step S950.

When it is determined at step S950 that the current heap area is not to be merged with the adjacent heap deallocation area, the virtual memory proceeds to step S930.

On the other hand, when it is determined at step S950 that the current heap area is to be merged with the adjacent heap deallocation area, the virtual memory compares the count value of the adjacent heap deallocation area with the count value of the current heap deallocation area, and sets and stores the count value of a merged heap deallocation area to a larger count value of the count values at step S960.

Here, the header area of the virtual memory is always set to colr=0 regardless of whether the heap is allocated and deallocated, thus blocking access by the program 10. The body area of the virtual memory is set to colr=0, thus blocking subsequent access to the heap deallocation area.

Figure 12:
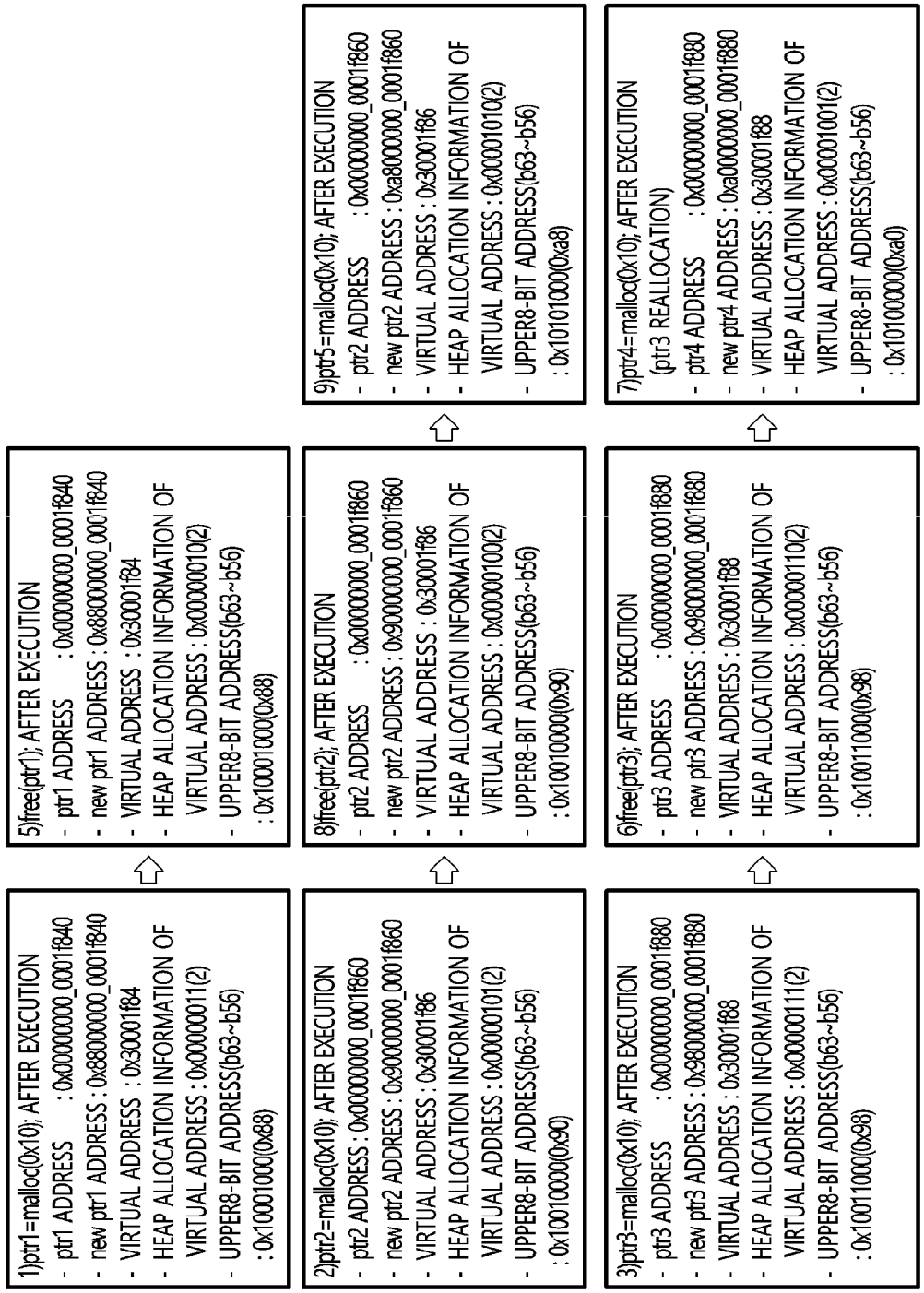
FIG. 12 is a diagram illustrating examples of a new pointer address, including heap allocation information, and the heap allocation information, stored in virtual memory, after heap allocation and reallocation according to an embodiment.
Figure 14:
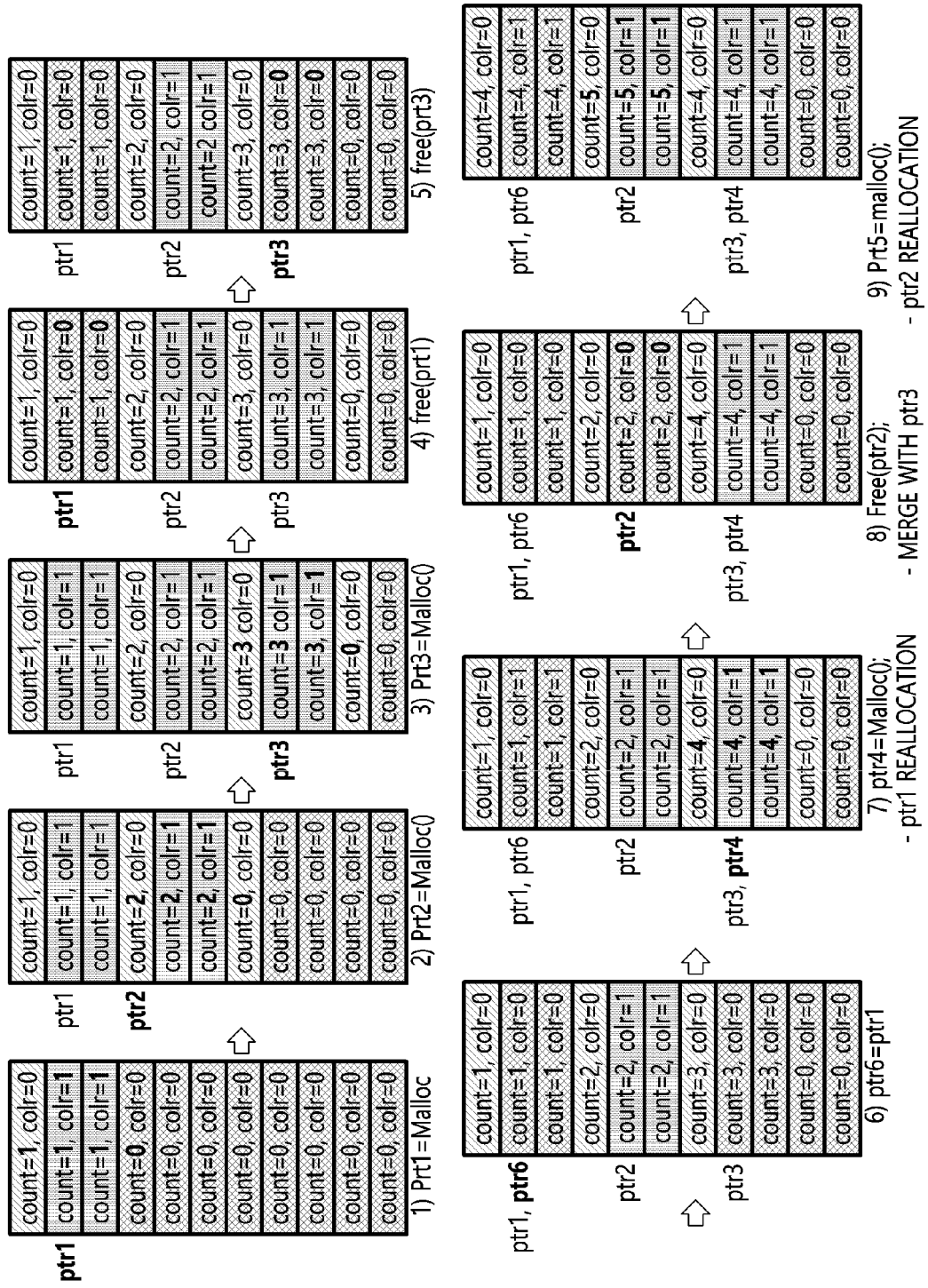
FIG. 14 is a diagram illustrating an example of setting of heap allocation information in virtual memory during heap allocation and deallocation according to an embodiment.

FIG. 11 is a diagram illustrating an example of a heap allocation program according to an embodiment, FIG. 12 is a diagram illustrating examples of a new pointer address, including heap allocation information, and the heap allocation information stored in virtual memory after heap allocation and reallocation according to an embodiment, FIG. 13 is a diagram illustrating an example of the result of execution of a heap reallocation program according to an embodiment, and FIG. 14 is a diagram illustrating an example of setting of heap allocation information in virtual memory during heap allocation and deallocation according to an embodiment.

FIGS. 11 to 14 show an embodiment of the case where a heap area is reallocated after being allocated and deallocated, using fastbin which manages deallocated heap areas in a single linked list in order to rapidly process dynamic memory reallocation.

Generally, in the case where deallocated heap areas are managed using fastbin, linked information with an adjacent heap deallocation area is not present. Accordingly, even though there is an adjacent heap deallocation area, the process is performed without a merge procedure, thus enabling faster reallocation of dynamic memory. Further, fastbin has characteristics in that the most recently deallocated heap area is reallocated.

Therefore, referring to FIG. 11, illustrated is an embodiment of a program in which three heap areas of the same size are allocated, deallocated, and reallocated, after which access to the deallocated and reallocated heap area is made.

Referring to FIG. 12, when the program illustrated in FIG. 11 is executed, examples of a new pointer address including heap allocation information (count, colr), a virtual address mapped to actual memory to or from which a heap is allocated or deallocated, and the heap allocation information stored at the virtual address are illustrated.

That is, after heap allocation, the program receives, as return values, new pointer addresses (new ptr1, new ptr2, and new ptr3) including heap allocation information (count, colr) instead of the actual memory addresses (ptr1, ptr2, and ptr3) to which heaps are allocated (1) to (3).

That is, the program receives, as a return value, the new pointer address (new ptr1=0x88000000_0001f840) including heap allocation information (count=1, colr=1) instead of the actual memory address (ptr1=0x00000000_0001f840), and receives, as a return value, the new pointer address (new ptr2=0x90000000_0001f860) including heap allocation information (count=2, colr=1) instead of the actual memory address (ptr2=0x00000000_0001f860). Further, the program receives, as a return value, the new pointer address (new ptr3=0x98000000_0001f880) including heap allocation information (count=3, colr=1) instead of the actual memory address (ptr3=0x00000000_0001f880).

Furthermore, when heap areas corresponding to ptr1 and ptr3 are deallocated (5) and (6), heap allocation information (count, colr) included in new ptr1 and new ptr3 is not changed, and only the heap allocation information (count=maintained at previous value, colr=0) of the virtual address is changed, and thus subsequent access to the deallocated addresses generates exception due to mismatch between the values of colr.

Thereafter, when a heap area having the same size is allocated (7), deallocated heap areas are searched for, and thus the most recently deallocated heap area is reallocated. That is, the heap deallocation area corresponding to ptr3 is reallocated to ptr4. Here, the program receives, as a return value, a new pointer address (new ptr4=0xa0000000_0001f840) including heap allocation information (count=4, colr=1) instead of the actual memory address (ptr3 and ptr4=0x00000000_0001f880).

In this case, although the new pointer addresses new ptr3 and new ptr4 are identical to each other in actual memory addresses, they include different pieces of heap allocation information, and then new ptr3 and new ptr4 are recognized as different addresses, whereby UAF detection may be performed.

Thereafter, when a heap area corresponding to ptr2 is deallocated (8), heap allocation information (count, colr) included in the new ptr2 address is not changed, and only the heap allocation information (count=maintained at previous value, colr=0) of the virtual address is changed, and thus subsequent access to the deallocated address generates exception due to mismatch between the values of colr.

Thereafter, when a heap area having the same size is allocated again (9), deallocated heap areas are searched for, and thus the most recently deallocated heap area is reallocated. That is, the heap deallocation area corresponding to ptr2 is reallocated to ptr5. Here, the program receives, as a return value, a new pointer address (new ptr5=0xa8000000_0001f840) including heap allocation information (count=5, colr=1) instead of the actual memory address (ptr2 and ptr5=0x00000000_0001f860). Although the new pointer addresses new ptr2 and new ptr5 are identical to each other in actual memory addresses, they include different pieces of heap allocation information, and then new ptr2 and new ptr5 are recognized as different addresses, whereby UAF detection may be performed.

FIG. 13 is a diagram illustrating an example of the result of accessing the corresponding address of a heap area after the heap area is allocated, deallocated, and reallocated, upon executing the program of FIG. 11. As illustrated in FIG. 13, pt1 and ptr6 have the same address and are the addresses of heap deallocated areas. Accordingly, when accessing the pt1 and ptr6, mismatch occurs between heap allocation information (colr=1) included in the addresses and heap allocation information (colr=0) stored in virtual addresses, thus resulting in exception. Although ptr2 is deallocated after heap allocation, mismatch occurs between the heap allocation information (count=2) included in the address and heap allocation information (count=5) included in the virtual address due to reallocation, thus resulting in exception. Although ptr3 is deallocated after heap allocation, mismatch occurs between the heap allocation information (count=3) included in the address and heap allocation information (count=4) included in the virtual address due to reallocation, thus resulting in exception. Furthermore, in the case of ptr4, heap allocation information (count=4, colr=1) included in an address returned to new ptr4 after reallocation matches heap allocation information (count=4, colr=1) stored at the virtual address, and in the case of ptr5, heap allocation information (count=5, colr=1) included in the address returned to new ptr5 after reallocation matches heap allocation information (count=5, colr=1) stored at the virtual address, and thus the program 10 is normally executed.

FIG. 14 illustrates an example of a process in which, when the program of FIG. 11 is executed, heap allocation information (count, colr) is set and stored at a virtual address, as illustrated in FIG. 12. Here, because an adjacent heap area and subsequent count information are stored, UAF may be detected.

Here, a shadow header and shadow body, which will be described below, refer to the header and the body of virtual memory.

1) ptr1=malloc(0x10): shadow header(0x30001f83, count=1, colr=0)+shadow body(0x30001f84, count=1, colr=1)
    Because there is no adjacent heap area, and only a current heap area (count=0) is present, a count value is increased by 1 and count=1 is set.
2) ptr2=malloc(0x10): shadow header(0x30001f85, count=2, colr=0)+shadow body(0x30001f86, count=2, colr=1)
    Because there is one adjacent heap area (previous heap area), the count value of the previous heap area (count=1), which is a larger count value between the count value of the previous heap area (count=1) and the count value of the current heap area (count=0), is increased by 1, and count=2 is set.
3) ptr3=malloc(0x10): shadow header(0x30001f87, count=3, colr=0)+shadow body(0x30001f88, count=3, colr=1)
    Because there are two adjacent heap areas (previous heap area and the heap area previous to the previous heap area), the count value of the previous heap area (count=2), which is the largest count value among the count value of the previous heap area (count=1), the count value of the previous heap area (count=2), and the count value of the current heap area (count=0), is increased by 1, and count=3 is set.
4) ptr6=ptr1;
   ptr6=0x88000000_0001f840 (the same address as ptr1)
5) Free(ptr1): shadow header(0x30001f83, count=1, colr=0)+shadow body(0x30001f84, count=1, colr=0)
    Because there is no adjacent heap deallocation area, the previous count value is maintained, and only the colr value of the shadow body is set to colr=0.
6) Free(ptr3): shadow header(0x30001f87, count=3, colr=0)+shadow body(0x30001f88, count=3, colr=0)
    Because there is no adjacent heap deallocation area, the previous count value is maintained, and only the colr value of the shadow body is set to colr=0.
7) ptr4=malloc(0x10): shadow header(0x30001f87, count=4, colr=0)+shadow body(0x30001f88, count=4, colr=1)
    The most recently deallocated heap area is reallocated (i.e., ptr3 area is reallocated).
    Because there are two adjacent heap areas (previous heap area and the heap area previous to the previous heap area), the count value of the current heap area (count=3), which is the largest count value among the count value of the previous heap area (count=1), the count value of the previous heap area (count=2), and the count value of the current heap area (count=3), is increased by 1, and count=4 is set.
8) Free(ptr2): shadow header(0x30001f85, count=2, colr=0)+shadow body(0x30001f86, count=2, colr=0)
    Because there is an adjacent heap deallocation area, but there is no merging, the previous count value is maintained, and only the colr value of the shadow body is set to colr=0.
9) ptr5=malloc(0x10): shadow header(0x30001f85, count=5, colr=0)+shadow body(0x30001f86, count=5, colr=1)
    Because there are two adjacent heap areas (previous heap area and next area), the count value of the next heap area (count=4), which is the largest count value among the count value of the previous heap area (count=1), the count value of the current heap area (count=2) and the count value of the next heap area (count=4), is increased by 1, and count=5 is set.

Figure 16:
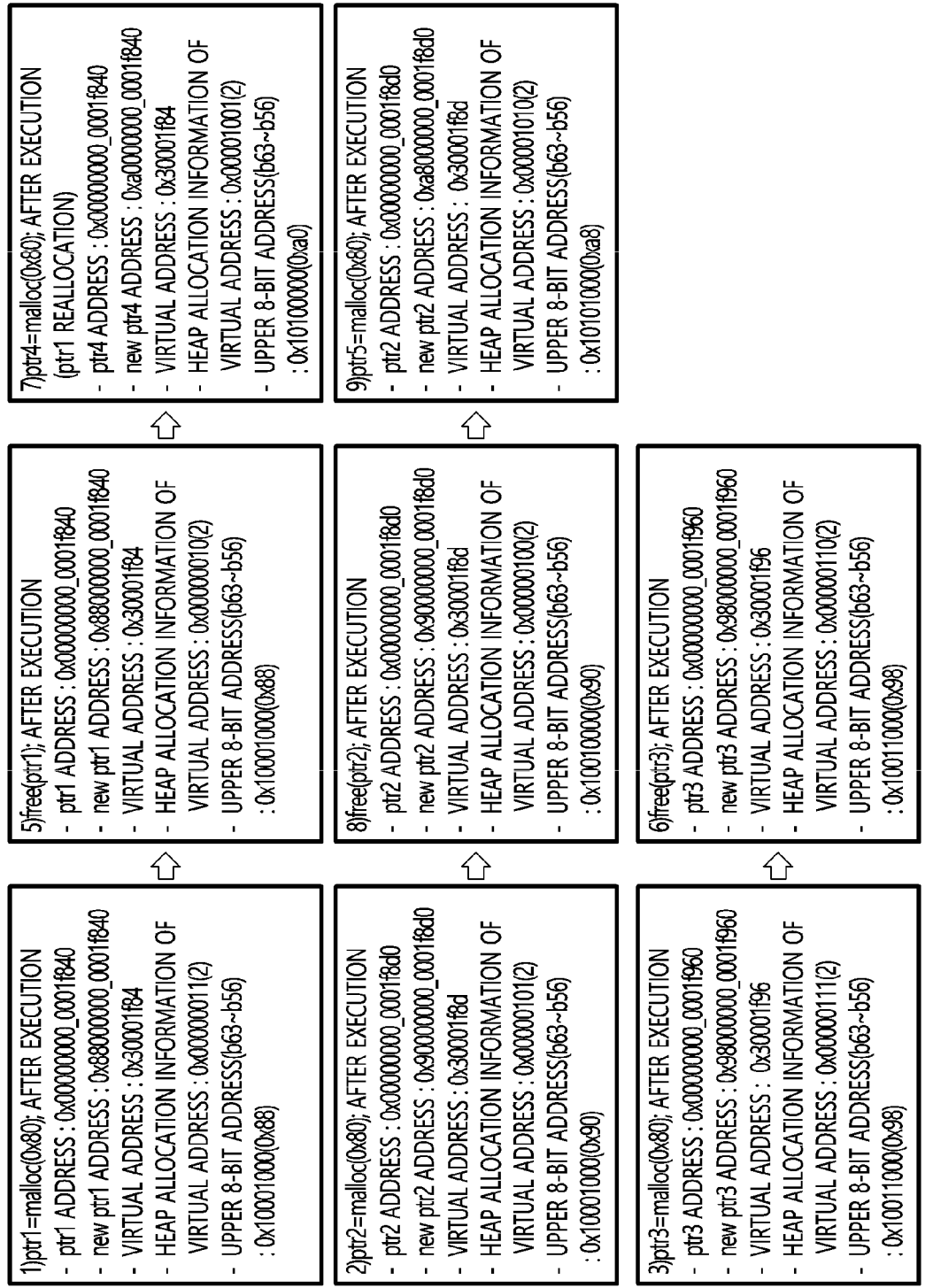
FIG. 16 is a diagram illustrating examples of a new pointer address, including heap allocation information, and the heap allocation information, stored in virtual memory, after heap allocation and reallocation according to another embodiment.
Figure 18:
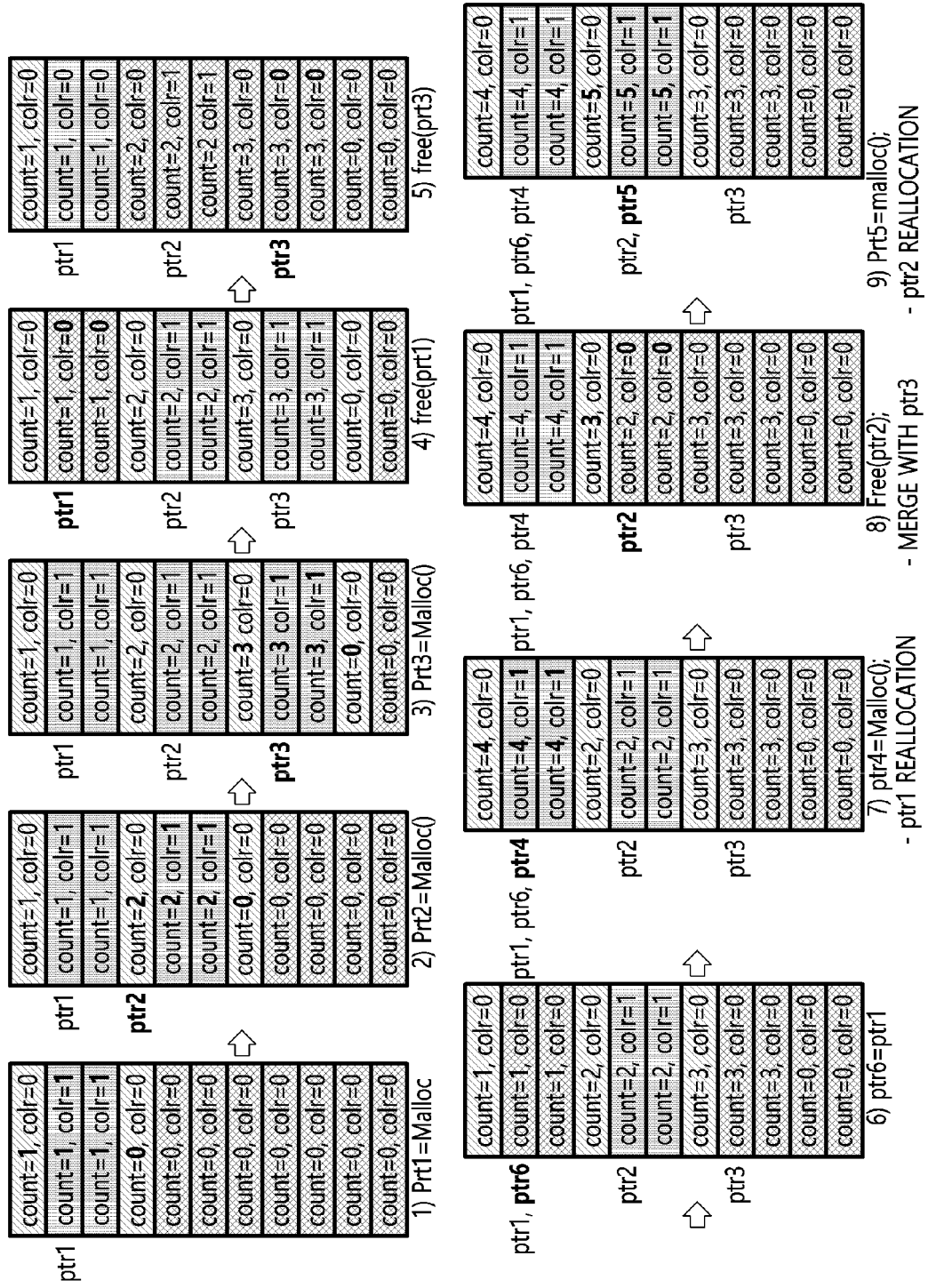
FIG. 18 is a diagram illustrating an example of setting of heap allocation information in virtual memory during heap allocation and deallocation according to another embodiment.

FIG. 15 is a diagram illustrating an example of a heap allocation program according to another embodiment, FIG. 16 is a diagram illustrating examples of a new pointer address, including heap allocation information, and the heap allocation information, stored in virtual memory, after heap allocation and reallocation according to another embodiment, FIG. 17 is a diagram illustrating an example of the result of execution of a heap reallocation program according to another embodiment, and FIG. 18 is a diagram illustrating an example of setting of heap allocation information in virtual memory during heap allocation and deallocation according to another embodiment.

FIGS. 15 to 18 show an embodiment of the case where a heap area is reallocated after being allocated and deallocated, using smallbin which manages deallocated heap areas in a double-linked list in order to efficiently process dynamic memory reallocation.

Generally, when there is an adjacent heap deallocation area in the case where a deallocated heap area is managed using smallbin, dynamic memory reallocation may be more efficiently performed through a merge process of merging the adjacent heap deallocation area with a heap area desired to be deallocated into one heap deallocation area.

Further, smallbin has characteristics in that the earliest deallocated heap area is reallocated. Therefore, FIG. 15 illustrates an embodiment of a program in which three heap areas of the same size are allocated, deallocated, and reallocated, after which access to the deallocated and reallocated heap area is made.

FIG. 16 illustrates examples of, when the program illustrated in FIG. 15 is executed, a new pointer address including heap allocation information (count, colr), a virtual address mapped to actual memory to or from which a heap is allocated or deallocated, and the heap allocation information stored at the virtual address.

Referring to FIG. 16, after heap allocation, the program receives, as return values, new pointer addresses (new ptr1, new ptr2, and new ptr3) including heap allocation information (count, colr) instead of the actual memory addresses (ptr1, ptr2, and ptr3) to which heaps are allocated (1) to (3).

That is, the program receives, as a return value, the new pointer address (new ptr1=0x88000000_0001f840) including heap allocation information (count=1, colr=1) instead of the actual memory address (ptr1=0x00000000_0001f840), and receives, as a return value, the new pointer address (new ptr2=0x90000000_0001f8d0) including heap allocation information (count=2, colr=1) instead of the actual memory address (ptr2=0x00000000_0001f8d0). Further, the program receives, as a return value, the new pointer address (new ptr3=0x98000000_0001f960) including heap allocation information (count=3, colr=1) instead of the actual memory address (ptr3=0x00000000_0001f960). Furthermore, when heap areas corresponding to ptr1 and ptr3 are deallocated (5) and (6), heap allocation information (count, colr) included in new ptr1 and new ptr3 is not changed, and only the heap allocation information (count=maintained at previous value, colr=0) of the virtual address is changed, and thus subsequent access to the deallocated addresses generates exception due to mismatch between the values of colr.

Thereafter, when a heap area having the same size is allocated (7), a deallocated heap area is searched for, and is then reallocated to the earliest deallocated heap area. That is, the heap deallocation area corresponding to ptr1 is reallocated to ptr4. Here, the program receives, as a return value, a new pointer address (new ptr4=0xa0000000_0001f840) including heap allocation information (count=4, colr=1) instead of the actual memory address (ptr1 and ptr4=0x00000000_0001f8d0). Although the new pointer addresses new ptr1 and new ptr4 are identical to each other in actual memory addresses, they include different pieces of heap allocation information, and then new ptr1 and new ptr4 are recognized as different addresses, whereby UAF detection may be performed. Thereafter, when the heap area corresponding to ptr2 is deallocated (8), the deallocated heap area is merged with an adjacent heap deallocation area corresponding to ptr3 into a single heap deallocation area. In this case, heap allocation information (count, colr) included in the new ptr2 address is not changed, and only the heap allocation information (count=2, colr=0) of the virtual address is changed. Thereafter, when access to the deallocated address is made, exception occurs due to mismatch between the values of colr. Next, when a heap area of the same size is allocated (9), a deallocated heap area is searched for and is then reallocated to the earliest deallocated heap area. In this case, ptr3 is merged with ptr2, and thus the heap deallocation area corresponding to ptr2 is reallocated to ptr5. Here, the program receives, as a return value, a new pointer address (new ptr5=0xa8000000_0001f8d0) including heap allocation information (count=5, colr=1) instead of the actual memory addresses (ptr2 and ptr5=0x00000000_0001f8d0). Although the new pointer addresses new ptr2 and new ptr5 are identical to each other in actual memory addresses, they include different pieces of heap allocation information, and then new ptr2 and new ptr5 are recognized as different addresses, whereby UAF detection may be performed.

FIG. 17 is a diagram illustrating an example of the result of accessing the corresponding address of a heap area after the heap area is allocated, deallocated, and reallocated, upon executing the program of FIG. 15.

As shown in FIG. 17, pt1 and ptr6 have the same address and are deallocated after heap allocation, but mismatch occurs between heap allocation information (count=1) included in the address due to reallocation and heap allocation information (count=4) stored at the virtual address, thus resulting in exception. Although ptr2 is also deallocated after heap allocation, mismatch occurs between the heap allocation information (count=2) included in the address and heap allocation information (count=5) included in the virtual address due to reallocation, thus resulting in exception. Because ptr3 is the address of a heap deallocated area after heap allocation, access to ptr3 causes mismatch between heap allocation information (colr=1) included in the address and heap allocation information (colr=0) stored at the virtual address, thus resulting in exception. Furthermore, in the case of ptr4, heap allocation information (count=4, colr=1) included in an address returned to new ptr4 after reallocation matches heap allocation information (count=4, colr=1) stored at the virtual address, and in the case of ptr5, heap allocation information (count=5, colr=1) included in the address returned to new ptr5 after reallocation matches heap allocation information (count=5, colr=1) stored at the virtual address, and thus the program 10 is normally executed.

FIG. 18 illustrates an example of a process in which, when the program 10 of FIG. 15 is executed, heap allocation information (count, colr) is set and stored at a virtual address, as illustrated in FIG. 16. Here, because an adjacent heap area and subsequent count information are stored, UAF may be detected.

Here, a shadow header and shadow body, which will be described below, refer to the header and the body of virtual memory.

1) ptr1=malloc(0x80): shadow header(0x30001f83, count=1, colr=0)+shadow body(0x30001f84, count=1, colr=1)

Because there is no adjacent heap area, and only a current heap area (count=0) is present, a count value is increased by 1 and count=1 is set.

2) ptr2=malloc(0x80): shadow header(0x30001f8c, count=2, colr=0)+shadow body(0x30001f8d, count=2, colr=1)

Because there is one adjacent heap area (previous heap area), the count value of the previous heap area (count=1), which is a larger count value between the count value of the previous heap area (count=1) and the count value of the current heap area (count=0), is increased by 1, and count=2 is set.

3) ptr3=malloc(0x80): shadow header(0x30001f95, count=3, colr=0)+shadow body(0x30001f96, count=3, colr=1)

Because there are two adjacent heap areas (previous heap area and the heap area previous to the previous heap area), the count value of the previous heap area (count=2), which is the largest count value among the count value of the previous heap area (count=1), the count value of the previous heap area (count=2), and the count value of the current heap area (count=0), is increased by 1, and count=3 is set.

4) ptr6=ptr1;
   ptr6=0x88000000_0001f840 (the same address as ptr1)

5) Free (ptr1): shadow header(0x30001f83, count=1, colr=0)+shadow body(0x30001f84, count=1, colr=0)

Because there is no adjacent heap deallocation area, the previous count value is maintained, and only the colr value of the shadow body is set to colr=0.

6) Free (ptr3): shadow header(0x30001f95, count=3, colr=0)+shadow body(0x30001f96, count=3, colr=0)

Because there is no adjacent heap deallocation area, the previous count value is maintained, and only the colr value of the shadow body is set to colr=0.
7) ptr4=malloc(0x80): shadow header(0x30001f83, count=4, colr=0)+shadow body(0x30001f84, count=4, colr=1)
The earliest deallocated heap area is reallocated (i.e., ptr1 area is reallocated).
Because there are two adjacent heap areas (next heap area and the heap area next to the next heap area), the count value of the next heap area (count=3), which is the largest count value among the count value of the current heap area (count=1), the count value of the next heap area (count=2), and the count value of the next heap area (count=3), is increased by 1, and count=4 is set.
8) Free (ptr2): shadow header(0x30001f8c, count=2, colr=0)+shadow body(0x30001f8d, count=2, colr=0)
Because there is an adjacent heap deallocation area (ptr3), the heap area is merged with the adjacent heap deallocation area to perform heap deallocation.
The count value of the header area of the virtual memory is set to count=4 by comparing the count value of the current heap area (count=2) with the count value of the adjacent heap deallocation area (count=3) and by increasing a larger value between the count values, that is, the count value of the heap deallocation area (count=3) by 1. Also, the count value of the body area is maintained at a previous count value and the value of colr is set to colr=0.
9) ptr5=malloc(0x80): shadow header(0x30001f85, count=5, colr=0)+shadow body(0x30001f86, count=5, colr=1)
Because there is one adjacent heap area (previous heap area), the count value of the previous heap area (count=4), which is a larger count value by comparing the count value of the previous heap area (count=4) with the count value of the current heap area (count=3), is increased by 1 and is set to count=5, and the value of colr is set to colr=1.

Figure 19:
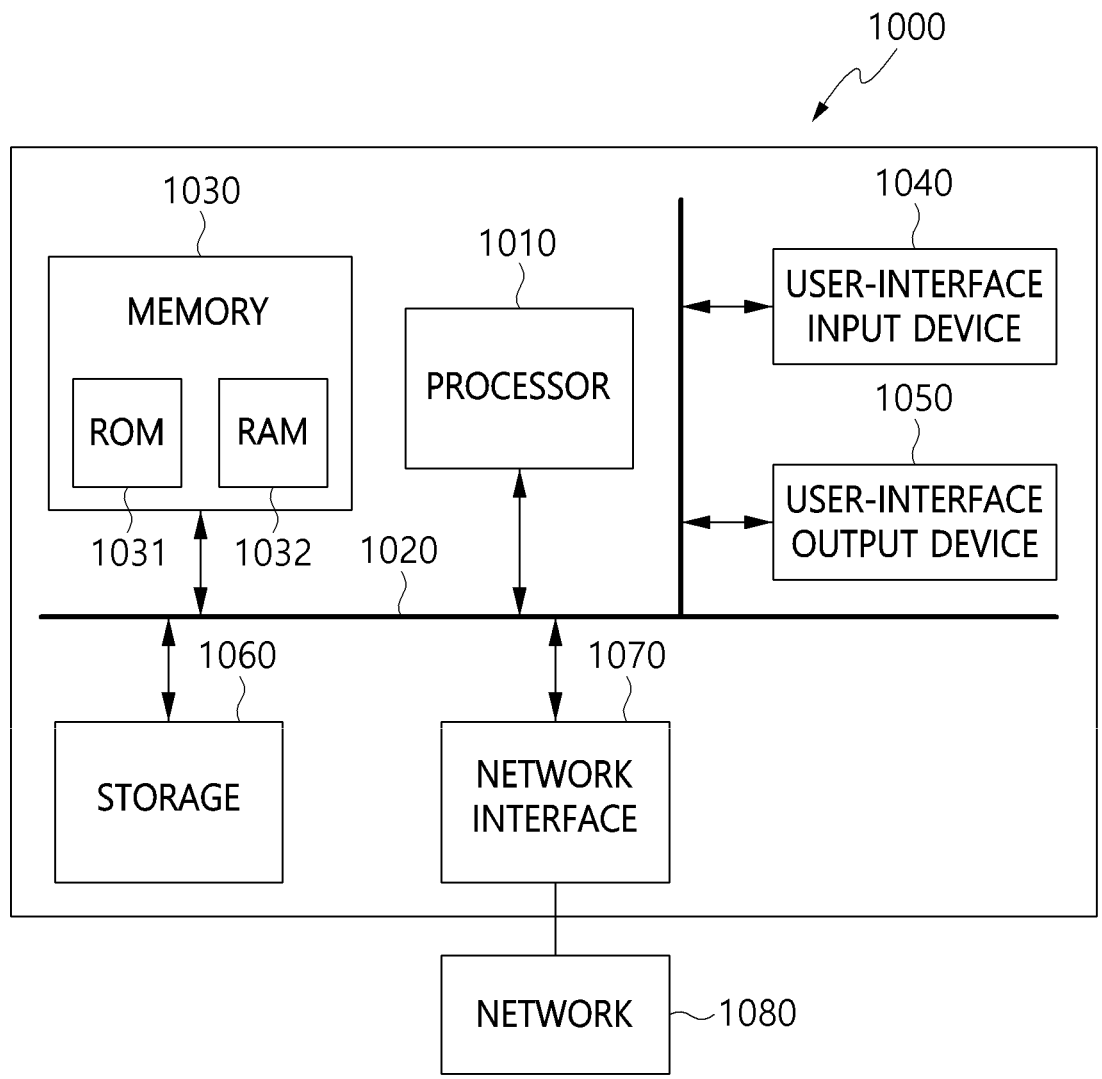
FIG. 19 is a diagram illustrating the configuration of a computer system according to an embodiment.

FIG. 19 is a diagram illustrating the configuration of a computer system according to an embodiment.

A dynamic memory management apparatus according to an embodiment may be implemented in a computer system 1000 such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, and an information delivery medium. For example, the memory 1030 may include Read-Only Memory (ROM) 1031 or Random Access Memory (RAM) 1032.

According to the embodiments, after an allocated dynamic memory area is deallocated, access to the deallocated memory area is blocked, thus detecting security vulnerabilities that occur the most frequently in dynamic memory management, such as UAF, and blocking attacks using the security vulnerabilities.

Further, according to the embodiments, different memory allocation addresses are returned each time even though a deallocated dynamic memory area is reallocated, and thus the occurrence of a dangling pointer for a previously deallocated address may be prevented to prohibit an attacker from abusing the deallocated address, with the result that more secure dynamic memory management may be realized.

Furthermore, according to the embodiments, when dynamic memory is allocated and deallocated, information about allocation of an adjacent heap area and additional allocation information are stored, and access to areas falling out of the range of the corresponding heap area are also detected, and thus UAF vulnerabilities may be detected, with the result that more secure dynamic memory management may be realized.

Although the embodiments of the present disclosure have been disclosed with reference to the attached drawing, those skilled in the art will appreciate that the present disclosure can be implemented in other concrete forms, without changing the technical spirit or essential features of the disclosure. Therefore, it should be understood that the foregoing embodiments are merely exemplary, rather than restrictive, in all aspects

What is claimed is:

1. A dynamic memory management apparatus, comprising:
   an actual memory configured to allocate or deallocate a heap;
   a virtual memory configured to set and store heap allocation information at a virtual address mapped to an actual address that is a body start address of a heap area of the actual memory; and
   a dynamic memory manager configured to process a memory allocation or deallocation request received from a program in conjunction with the actual memory and the virtual memory,
   wherein the heap allocation information includes access authority information for storing information indicating whether a heap at an actual address is allocated or deallocated, and count information that is increased whenever a heap is allocated, and
   wherein the dynamic memory manager is configured to:
   return an address pointer including an actual address of a heap allocated to the actual memory and the heap allocation information to the program, and
   process a heap deallocation or reallocation request based on the heap allocation information included in a requested address pointer.

2. The dynamic memory management apparatus of claim 1, wherein the dynamic memory manager performs:
   as a request to allocate a heap having a predetermined size is received from the program, requesting the actual memory to allocate the heap having the predetermined size;
   requesting the virtual memory to set and store the heap allocation information at a virtual address mapped to the actual address of the heap allocated to the actual memory; and
   returning a pointer address including the actual address and the heap allocation information to the program.

3. The dynamic memory management apparatus of claim 2, wherein the dynamic memory manager further performs:
   as a request to deallocate an allocated heap included in the address pointer is received from the program, obtaining heap allocation information stored at the virtual address mapped to the actual address requested to be deallocated from the virtual memory;

when the heap allocation information included in the address pointer matches the heap allocation information obtained from the virtual memory, requesting the actual memory to deallocate the heap corresponding to the actual address;

requesting the virtual memory to set and store heap deallocation information at the virtual address mapped to the actual address of the heap deallocated from the actual memory; and registering a deallocated heap area in a heap deallocation linked list.

4. The dynamic memory management apparatus of claim 3, wherein the dynamic memory manager further performs:

when a request to allocate a heap having a size identical to a previous allocation size is received from the program, requesting the actual memory to reallocate a heap for a heap deallocation area in a case where a reallocable heap area is present in the heap deallocation linked list in requesting the actual memory to allocate the heap;

returning a pointer address including heap allocation information in which count information for the heap area is increased in returning to the program; and deleting the reallocated heap area from the heap deallocation linked list.

5. The dynamic memory management apparatus of claim 4, wherein the dynamic memory manager further performs:

as a request to use the actual address together with the address pointer is received from the program, obtaining the heap allocation information stored at the virtual address mapped to the actual address from the virtual memory;

comparing count information of the heap allocation information included in the pointer address with count information of the heap allocation information obtained from the virtual memory; and processing the use request or generating exception based on a result of the comparison.

6. The dynamic memory management apparatus of claim 1, wherein the address pointer is configured such that:

an actual address is recorded in an address field of partial lower bits, access authority information and count information are sequentially recorded in a reserved field of partial upper bits, and the count information is changed depending on a size of the reserved field.

7. The dynamic memory management apparatus of claim 1, wherein:

the actual memory is allocated to be separated into a heap header area and a heap body area, the heap header area includes size information of a previous heap area and size information of a current heap area, and the heap body area includes the actual address returned to the program.

8. The dynamic memory management apparatus of claim 7, wherein the virtual memory is individually mapped to the heap header area and the heap body area of the actual memory.

9. The dynamic memory management apparatus of claim 8, wherein, in response to a heap allocation information setting request, the count information of the virtual memory is set to:

when at least one adjacent heap area is not present, a value obtained by increasing count information of a current heap area, and when at least one adjacent heap area is present, a value obtained by increasing a maximum value of a count value of the at least one adjacent heap area and a count value of the current heap area.

10. The dynamic memory management apparatus of claim 8, wherein, in response to a heap allocation information setting request, the access authority information of the virtual memory is set such that a header area is set to '0' and a body area is set to '1'.

11. The dynamic memory management apparatus of claim 8, wherein:

in response to a heap deallocation information setting request, the count information of the virtual memory is configured to:

when at least one adjacent heap deallocation area is not present, maintain the count information of the heap area at a count value of the current heap area, when at least one adjacent heap deallocation area is present and the heap area is to be merged with the at least one adjacent heap deallocation area, set a count value of a merged heap deallocation area to a larger value of a count value of the adjacent heap deallocation area and a count value of a current heap deallocation area, and when at least one adjacent heap deallocation area is present and the heap area is not to be merged with the at least one adjacent heap deallocation area, maintain and set a previous count value of the current heap area.

12. The dynamic memory management apparatus of claim 11, wherein, in response to the heap deallocation information setting request, the access authority information of the virtual memory is configured such that the header area is set to '0' and the body area is set to '0'.

13. A dynamic memory allocation method being performed using a dynamic memory management apparatus, wherein:

the dynamic memory management apparatus comprises:

an actual memory configured to allocate or deallocate a heap; and a virtual memory configured to set and store heap allocation information at a virtual address mapped to an actual address that is a body start address of a heap area of the actual memory, wherein the heap allocation information includes access authority information for storing information indicating whether a heap at an actual address is allocated or deallocated, and count information that is increased whenever a heap is allocated, and the dynamic memory allocation method comprises:

as a request to allocate a heap having a predetermined size is received from a program, requesting the actual memory to allocate the heap having the predetermined size;

requesting the virtual memory to set and store the heap allocation information at a virtual address mapped to the actual address of the heap allocated to the actual memory; and returning a pointer address including the actual address and the heap allocation information to the program.

14. The dynamic memory allocation method of claim 13, further comprising:

when a request to allocate a heap having a size identical to a previous allocation size is received from the program, requesting the actual memory to reallocate a heap for a heap deallocation area in a case where a reallocable heap area is present in a heap deallocation linked list in requesting the actual memory to allocate the heap;

returning a pointer address including heap allocation information in which the count information for the heap area is increased in returning to the program; and deleting the reallocated heap area from the heap deallocation linked list.

15. The dynamic memory allocation method of claim 14, further comprising:

as a request to use the actual address together with the address pointer is received from the program, obtaining the heap allocation information stored at the virtual address mapped to the actual address from the virtual memory;

comparing count information of the heap allocation information included in the pointer address with count information of the heap allocation information obtained from the virtual memory; and processing the use request or generating exception based on a result of the comparison.

16. The dynamic memory allocation method of claim 14, wherein, in response to a heap allocation information setting request, the count information of the virtual memory is set to:

when at least one adjacent heap area is not present, a value obtained by increasing count information of a current heap area, and when at least one adjacent heap area is present, a value obtained by increasing a maximum value of a count value of the at least one adjacent heap area and a count value of the current heap area.

17. The dynamic memory allocation method of claim 16, wherein, in response to a heap allocation information setting request, the access authority information of the virtual memory is set such that a header area is set to '0' and a body area is set to '1'.

18. A dynamic memory deallocation method being performed using a dynamic memory management apparatus, wherein:

the dynamic memory management apparatus comprises:
an actual memory configured to allocate or deallocate a heap; and
a virtual memory configured to set and store heap allocation information at a virtual address mapped to an actual address that is a body start address of a heap area of the actual memory, and the dynamic memory deallocation method comprises:

as a request to deallocate an allocated heap included in an address pointer is received from a program, obtaining heap allocation information stored at a virtual address mapped to the actual address requested to be deallocated from the virtual memory;

when the heap allocation information included in the address pointer matches heap allocation information obtained from the virtual memory, requesting the actual memory to deallocate the heap corresponding to the actual address;

requesting the virtual memory to set and store heap deallocation information at the virtual address mapped to the actual address of the heap deallocated from the actual memory; and registering a deallocated heap area in a heap deallocation linked list.

19. The dynamic memory deallocation method of claim 18, wherein:

in response to a heap deallocation information setting request, a count information of the virtual memory is configured to:

when at least one adjacent heap deallocation area is not present, maintain the count information of the heap area at a count value of the current heap area, when at least one adjacent heap deallocation area is present and the heap area is to be merged with the at least one adjacent heap deallocation area, set a count value of a merged heap deallocation area to a larger value of a count value of the adjacent heap deallocation area and a count value of a current heap deallocation area, and when at least one adjacent heap deallocation area is present, and the heap area is not to be merged with the at least one adjacent heap deallocation area, maintain and set a previous count value of the current heap area.

20. The dynamic memory deallocation method of claim 19, wherein, in response to the heap deallocation information setting request, the access authority information of the virtual memory is configured such that the header area is set to '0' and the body area is set to '0'.

* * * * *